US012233653B2

(12) United States Patent
Sugawara et al.

(10) Patent No.: US 12,233,653 B2
(45) Date of Patent: Feb. 25, 2025

(54) LIQUID EJECTING HEAD AND LIQUID EJECTING APPARATUS

(71) Applicant: SEIKO EPSON CORPORATION, Tokyo (JP)

(72) Inventors: Yoshiki Sugawara, Mikawa (JP); Hiroyuki Hagiwara, Matsumoto (JP); Takahiro Kanegae, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 154 days.

(21) Appl. No.: 17/974,604

(22) Filed: Oct. 27, 2022

(65) Prior Publication Data

US 2023/0139118 A1 May 4, 2023

(30) Foreign Application Priority Data

Oct. 28, 2021 (JP) ................................ 2021-176204

(51) Int. Cl.
*B41J 2/175* (2006.01)
*B41J 2/14* (2006.01)

(52) U.S. Cl.
CPC ....... *B41J 2/17596* (2013.01); *B41J 2/14233* (2013.01); *B41J 2002/14338* (2013.01); *B41J 2202/05* (2013.01)

(58) Field of Classification Search
CPC .... B41J 2/175; B41J 2/17596; B41J 2/14233; B41J 2002/14338; B41J 2202/05
See application file for complete search history.

(56) References Cited

U.S. PATENT DOCUMENTS 6,447,106 B1 * 9/2002 Watanabe .............. B41J 2/1631 347/70
2009/0073234 A1 3/2009 Akahane
2015/0251430 A1 9/2015 Ishii et al.
2017/0217169 A1 8/2017 Kanegae et al.
2017/0225456 A1 8/2017 Watanabe et al.
(Continued)

FOREIGN PATENT DOCUMENTS

JP 2009-083471 A 4/2009
JP 2015-168139 A 9/2015
JP 2017-136721 A 8/2017
(Continued)

*Primary Examiner* — Jason S Uhlenhake
(74) *Attorney, Agent, or Firm* — Harness, Dickey & Pierce, P.L.C.

(57) ABSTRACT

A liquid ejecting head includes a liquid ejecting section, a first-valve-unit adjusting a pressure of liquid to be supplied to the liquid ejecting section, and a housing accommodating the liquid ejecting section and the first-valve-unit, in which the first-valve-unit includes a first-flow-path communicating with the liquid ejecting section, a first flexible film that has a first-inner-surface defining a part of the first-flow-path and a first-outer-surface being opposite from the first inner surface, and is configured to displace in a first-direction from the first-outer-surface toward the first-inner-surface and in a second-direction opposite to the first-direction, and a first-valve-body that is moved between an opening position and a closing position, due to displacement of the first flexible film, and the housing has a first-opening-portion facing at least a part of the first-outer-surface.

18 Claims, 14 Drawing Sheets

(56) References Cited

U.S. PATENT DOCUMENTS

| | | | | |
|---|---|---|---|---|
| 2019/0077163 | A1 | 3/2019 | Sato et al. | |
| 2020/0376847 | A1* | 12/2020 | Sato | B41J 2/175 |

FOREIGN PATENT DOCUMENTS

| | | | |
|---|---|---|---|
| JP | 2017-140760 | A | 8/2017 |
| JP | 2019-051614 | A | 4/2019 |
| JP | 2020-192756 | A | 12/2020 |

* cited by examiner

LIQUID EJECTING HEAD AND LIQUID EJECTING APPARATUS

The present application is based on, and claims priority from JP Application Serial Number 2021-176204, filed Oct. 28, 2021, the disclosure of which is hereby incorporated by reference herein in its entirety.

BACKGROUND

1. Technical Field

The present disclosure relates to a liquid ejecting head and a liquid ejecting apparatus that eject liquid from a nozzle, and particularly to an ink jet type recording head and an ink jet type recording apparatus that eject ink as liquid.

2. Related Art

The liquid ejecting head is provided with a pressure adjustment unit that opens and closes a flow path to adjust a supply pressure of the liquid in the middle of the flow path for supplying the liquid from a storage unit in which the liquid is stored (for example, see JP-A-2019-51614 and JP-A-2009-83471).

The pressure adjustment unit opens and closes the flow path by forming a part of the flow path by a diaphragm, making a pressure of the liquid in the flow path negative with respect to an atmospheric pressure, deforming the diaphragm in accordance with a differential pressure between the pressure of the liquid in the flow path and the atmospheric pressure outside the diaphragm, and moving a valve body by the diaphragm.

In the liquid ejecting head having the pressure adjustment unit as in JP-A-2019-51614, in some cases, it is necessary to forcibly open the flow path in the pressure adjustment unit. Examples of when it is necessary to forcibly open the flow path in the pressure adjustment unit include a time of pressurization cleaning in which the liquid is discharged from the nozzle by pressurizing the liquid from upstream of the pressure adjustment unit, and a time of initial filling in which the liquid is supplied to the liquid ejecting head by pressurizing the liquid from upstream of the pressure adjustment unit. In addition, another example thereof includes a time of a printing inspection in which a valve function of the pressure adjustment unit is invalidated and the liquid is ejected from the liquid ejecting head to confirm a printing state to confirm a liquid ejection characteristic.

However, when the pressure adjustment unit is disposed in a housing of the liquid ejecting head as in JP-A-2009-83471, in order to forcibly open the flow path blocked by the valve body, it is necessary to dispose a mechanism that presses a flexible film of the pressure adjustment unit by pressurizing and supplying air, or a mechanism that mechanically presses a flexible film of the pressure adjustment unit using an eccentric cam or a drive rod in the housing of the liquid ejecting head. There is a problem that a size of the liquid ejecting head is increased in order to secure a space for disposing such a mechanism in the housing of the liquid ejecting head.

SUMMARY

According to an aspect of the present disclosure, there is provided a liquid ejecting head including a liquid ejecting section that ejects liquid, a first valve unit that adjusts a pressure of the liquid to be supplied to the liquid ejecting section, and a housing that accommodates the liquid ejecting section and the first valve unit, in which the first valve unit includes a first flow path that communicates with the liquid ejecting section, a first flexible film that has a first inner surface defining a part of the first flow path and a first outer surface being opposite to the first inner surface and being in contact with an atmosphere, and is displaceable in a first direction from the first outer surface toward the first inner surface and in a second direction opposite to the first direction, and a first valve body that is moved between an opening position at which the first flow path is opened and a closing position at which the first flow path is closed, due to displacement of the first flexible film, and the housing has a first opening portion that is formed at a position facing at least a part of the first outer surface.

In addition, according to another aspect of the present disclosure, there is provided a liquid ejecting apparatus including the liquid ejecting head according to the aspect described above, and a liquid storage section that stores the liquid to be supplied to the liquid ejecting head.

DESCRIPTION OF EXEMPLARY EMBODIMENTS

Figure 1:
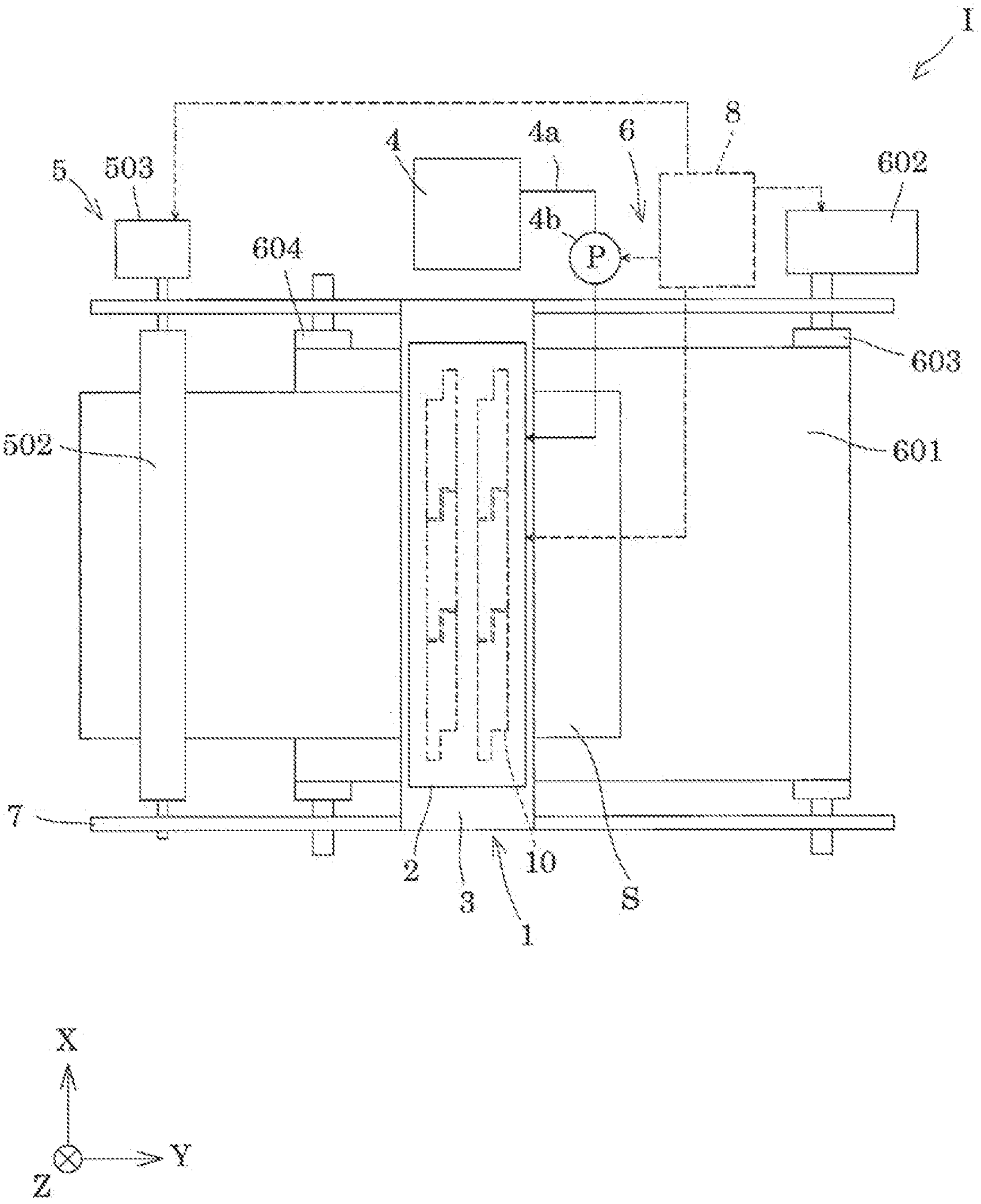
FIG. 1 is a schematic view of a liquid ejecting apparatus.

In the following, the present disclosure will be described in detail based on the embodiments. It should be noted that the following description shows one aspect of the present disclosure, and can be optionally changed within the scope of the present disclosure. The components having the same reference numerals in the figures indicate the same members, and the description thereof will be omitted as appropriate. Also, X, Y, and Z in each figure indicate three spatial axes that are orthogonal to each other. In the present specification, the directions along these spatial axes are referred to as an X direction, a Y direction, and a Z direction. In the description, a direction in which an arrow in each figure is directed is referred to as a positive (+) direction, and an opposite direction of the arrow is referred to as a negative (−) direction. In addition, the three spatial axes that do not limit the positive direction and the negative direction will be described as an X axis, a Y axis, and a Z axis.

First Embodiment

Figure 2:
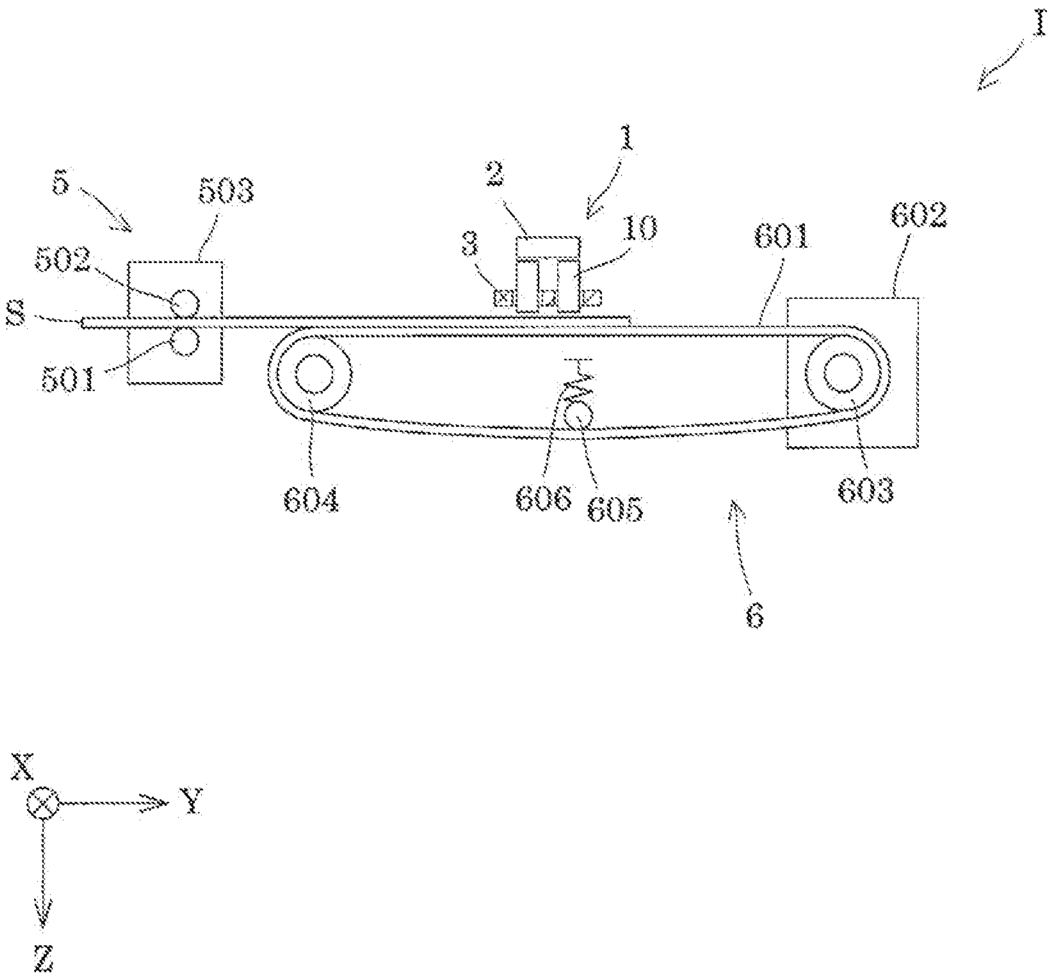
FIG. 2 is a schematic view of a main section of the liquid ejecting apparatus.

FIG. 1 is a schematic view showing a schematic configuration of a liquid ejecting apparatus according to a first embodiment of the present disclosure as viewed in the +Z direction. FIG. 2 is a schematic view of an ink jet type recording apparatus, which is the liquid ejecting apparatus, as viewed in the +X direction.

As shown in FIGS. 1 and 2, an ink jet type recording apparatus I, which is an example of the "liquid ejecting apparatus" according to the present embodiment is a printing apparatus that ejects and impacts ink, which is a type of liquid, on a medium S, such as printing paper, to perform printing of an image or the like (also referred to as a recording operation) by arranging dots formed on the medium S. It should be noted that, any material, such as a resin film or cloth, can be used as the medium S in addition to the printing paper. In addition, the ink jet type recording apparatus I according to the present embodiment is a so-called line-type recording apparatus that performs printing by ejecting and impacting the ink from an ink jet type recording head 10 to the medium S while transporting the medium S in a state being fixed to the ink jet type recording head 10 during printing.

The ink jet type recording apparatus I includes a head unit 1 including the ink jet type recording head 10 (hereinafter, also simply referred to as a recording head 10), which is an example of a "liquid ejecting head", a supply member 2 that supplies the ink to the head unit 1, a liquid storage section 4 that stores the ink, an apparatus main body 7, and a control unit 8.

Figure 7:
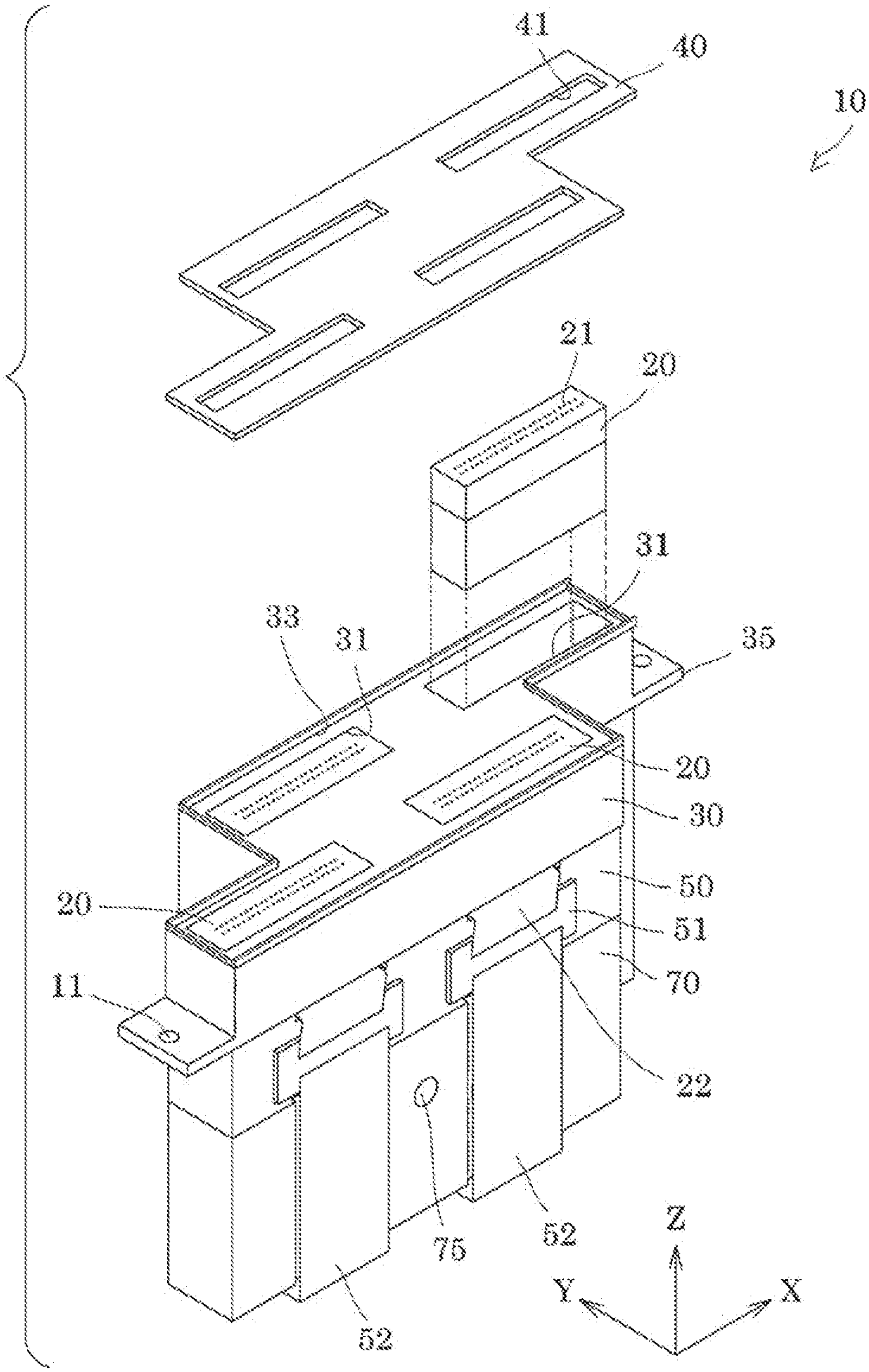
FIG. 7 is an exploded perspective view of the recording head.

The head unit 1 has a plurality of recording heads 10 capable of ejecting the ink from a nozzle 21 (see FIG. 7). The plurality of recording heads 10 are arranged side by side in a direction intersecting the +Y direction, which is a transport direction of the medium S, that is, a direction along the X axis in the present embodiment. It should be noted that the details of the head unit 1 will be described later. In addition, although the head unit 1 according to the present embodiment has the plurality of recording heads 10, the number of the recording heads 10 constituting the head unit 1 is not particularly limited, and the head unit 1 may include one recording head 10. The supply member 2 is fixed to such a head unit 1. The ink supplied from the supply member 2 is supplied to each recording head 10 constituting the head unit 1.

The liquid storage section 4 stores the ink to be supplied to the recording head 10. The ink stored in the liquid storage section 4 is the ink that contributes to printing, that is, the ink that is ejected as droplets from the nozzle 21 of the recording head 10 in order to form an image or the like on the medium S. Examples of the liquid storage section 4 include a cartridge that can be attached to and detached from the ink jet type recording apparatus I, a bag-shaped ink pack made of a flexible film, and a tank that can be refilled with the liquid. In the present embodiment, such a liquid storage section 4 is fixed to the apparatus main body 7. It should be noted that, although not particularly shown, a plurality of types of ink having different colors or types are individually stored in the liquid storage section 4. In addition, a sub tank may be provided between the liquid storage section 4 and the head unit 1. When the ink in the sub tank is reduced, the reduced amount of the ink may be replenished from the liquid storage section 4 to the sub tank.

The ink from the liquid storage section 4 is supplied to each recording head 10 of the head unit 1 via a supply pipe 4*a*, such as a tube. In addition, in the middle of the supply pipe 4*a*, a pump 4*b*, which is a pressurizing mechanism that pressurizes and supplies the ink from the liquid storage section 4 toward the recording head 10, is provided. It should be noted that the pressurizing mechanism is not limited to the pump 4*b*, and may be a pressing mechanism or the like that presses the liquid storage section 4 from the outside. In addition, the pressurizing mechanism may use a water head differential pressure generated by adjusting a relative position in a vertical direction between the recording head 10 and the liquid storage section 4. It should be noted that, in the present embodiment, the liquid storage section 4 is fixed to the apparatus main body 7, but for example, a liquid storage section, such as an ink cartridge, may be mounted on the supply member 2, that is, on the −Z direction side of the supply member 2.

In addition, the ink jet type recording apparatus I may include a transport unit. A first transport unit 5 as an example of the transport unit is provided on the −Y direction side of the ink jet type recording apparatus I. The first transport unit 5 includes a first transport roller 501 and a first driven roller 502 that is driven by the first transport roller 501. The first transport roller 501 is provided on a back surface side opposite to an impact surface on which the ink of the medium S is impacted, and is driven by a driving force of a first drive motor 503. In addition, the first driven roller 502 is provided on the impact surface side on which the ink of the medium S is impacted, and interposes the medium S with the first transport roller 501. Such a first driven roller 502 presses the medium S toward the first transport roller 501 side by an urging member, such as a spring (not shown).

In addition, a second transport unit 6 as an example of the transport unit is disposed in the +Y direction downstream of the transport direction of the medium S with respect to the first transport unit 5, and includes a transport belt 601, a second drive motor 602, a second transport roller 603, a second driven roller 604, and a tension roller 605. The second transport roller 603 is driven by the driving force of the second drive motor 602. The transport belt 601 is formed by an endless belt, and is hung on outer circumferences of the second transport roller 603 and the second driven roller 604. Such a transport belt 601 is provided on the back surface side of the medium S. The tension roller 605 is provided between the second transport roller 603 and the second driven roller 604, abuts on an inner circumferential surface of the transport belt 601, and applies tension to the transport belt 601 by an urging force of the urging member 606, such as a spring. As a result, the transport belt 601 has a flat surface that faces the recording head 10 between the second transport roller 603 and the second driven roller 604.

The control unit 8 is a controller according to the present embodiment, and although not particularly shown, for example, includes a control device, such as a central processing unit (CPU) or a field programmable gate array (FPGA), and a storage device, such as a semiconductor memory. In the control unit 8, each element of the ink jet type recording apparatus I, that is, the recording head 10, the first transport unit 5, the second transport unit 6, the pump 4*b*, and the like are comprehensively controlled by the control device executing a program stored in the storage device. That is, the control unit 8 controls the recording operation and the like. In addition, the control unit 8 controls a pressing mechanism 80 (see FIG. 14) that forcibly opens a valve unit 60, which will be described later in detail, to open a valve unit flow path 64.

In such an ink jet type recording apparatus I, printing is performed by ejecting the ink from the recording head 10 in the +Z direction while transporting the medium S by the first transport unit 5 and the second transport unit 6 in the +Y direction with respect to the head unit 1, and impacting the ejected ink in the medium S. The transport unit is not limited to the first transport unit 5 and the second transport unit 6 described above, and a transport unit including a drum or the like may be used.

Figure 3:
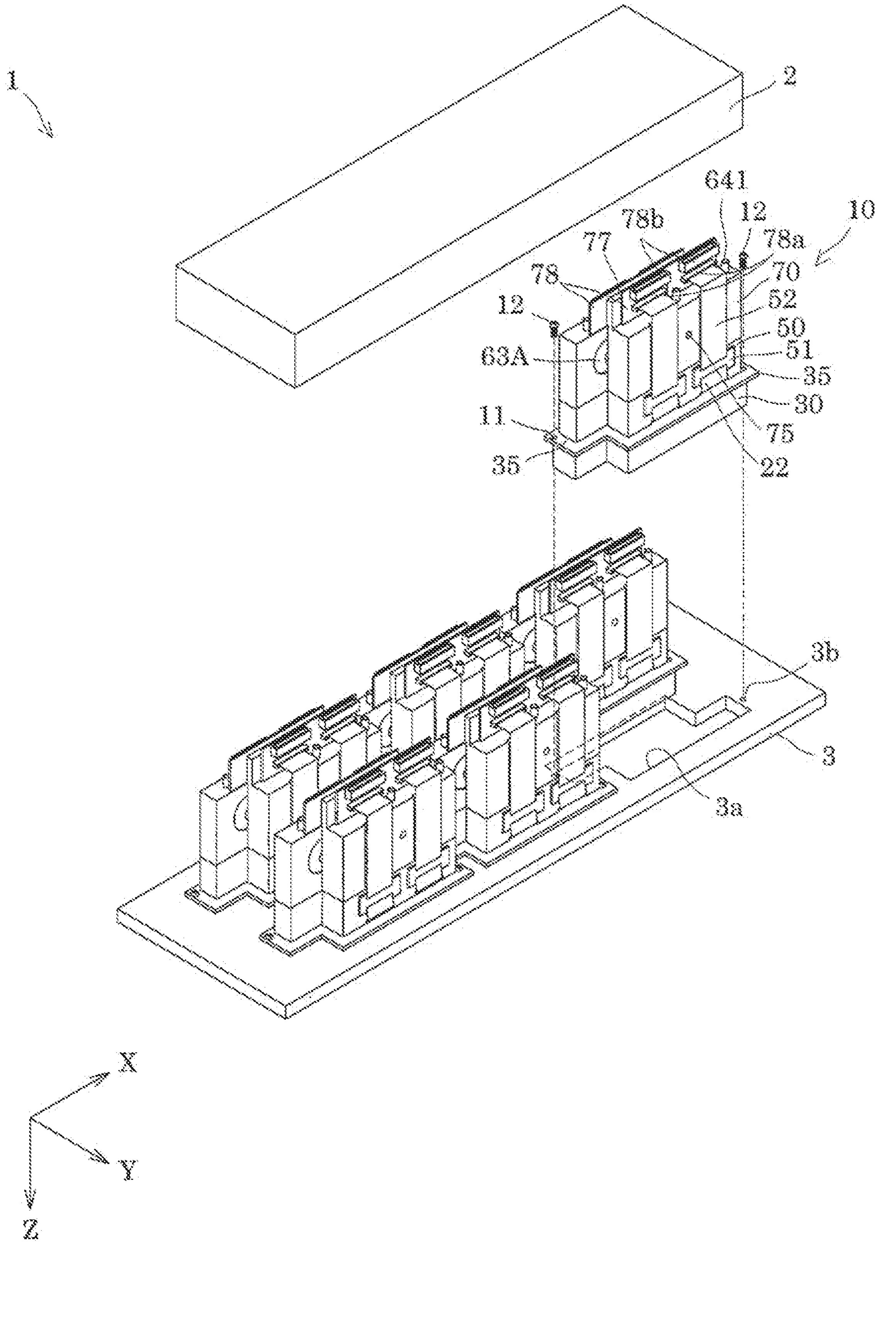
FIG. 3 is an exploded perspective view of a supply member and a head unit.
Figure 4:
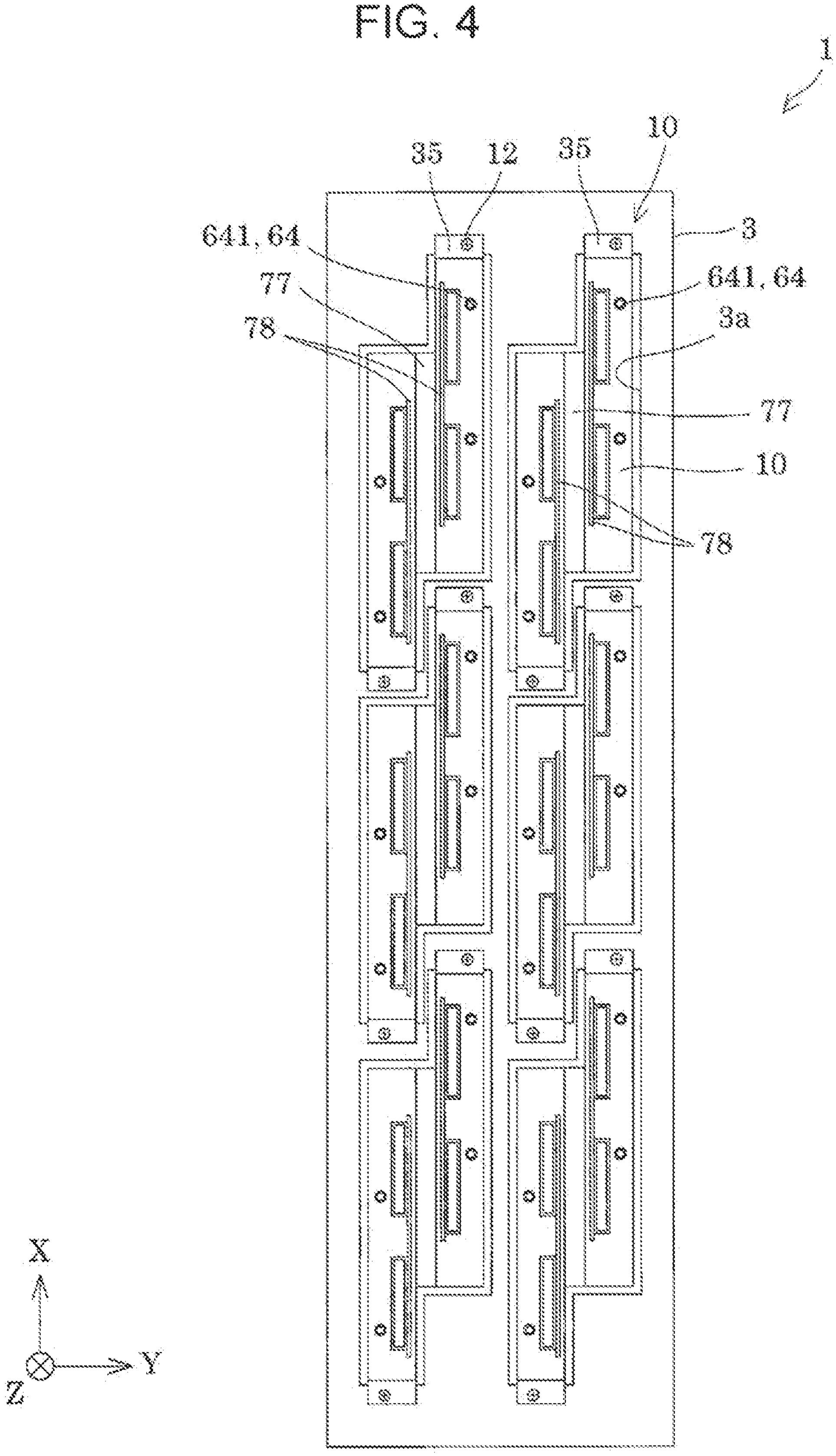
FIG. 4 is a plan view of the head unit.
Figure 5:
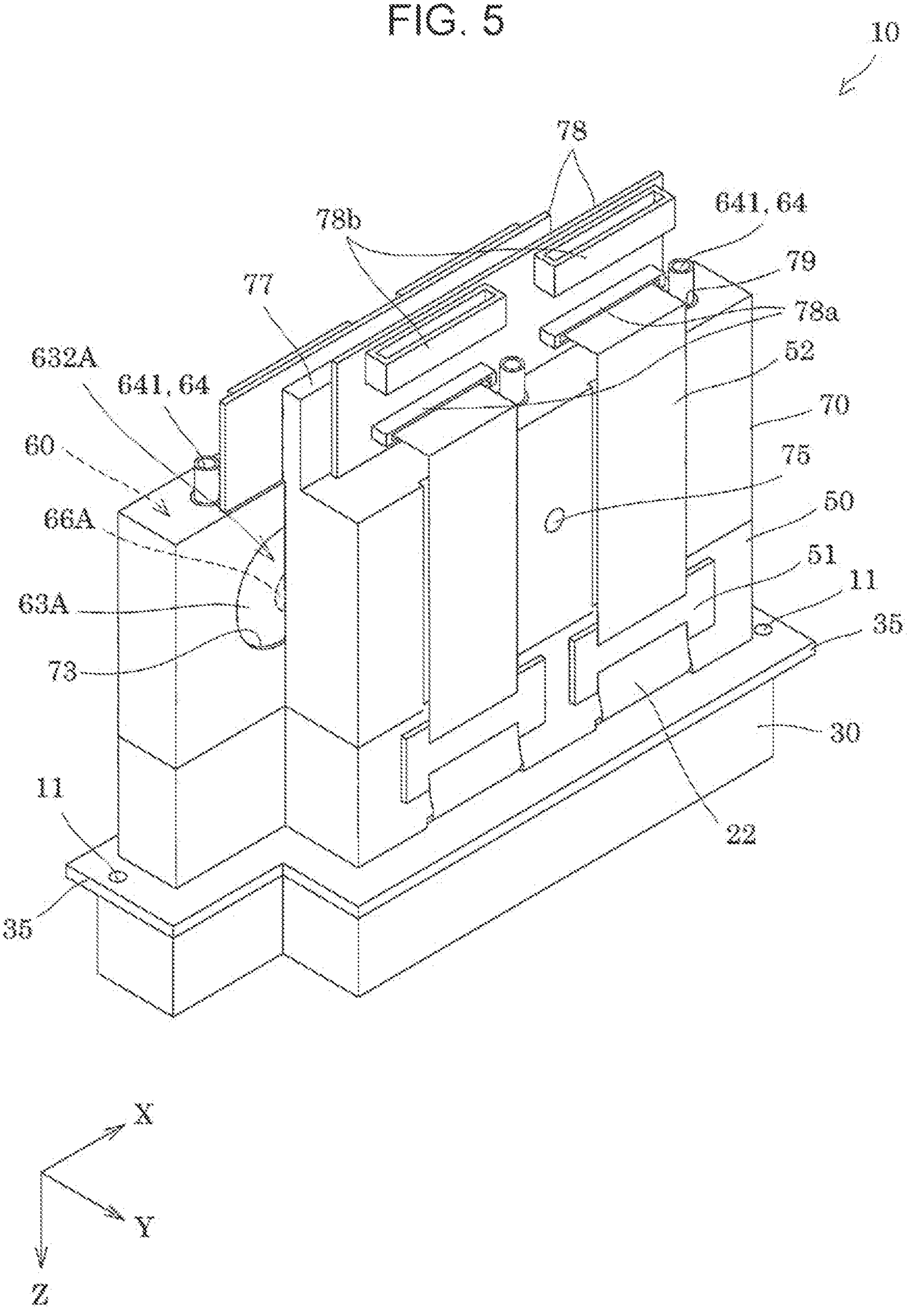
FIG. 5 is a perspective view of a recording head.
Figure 6:
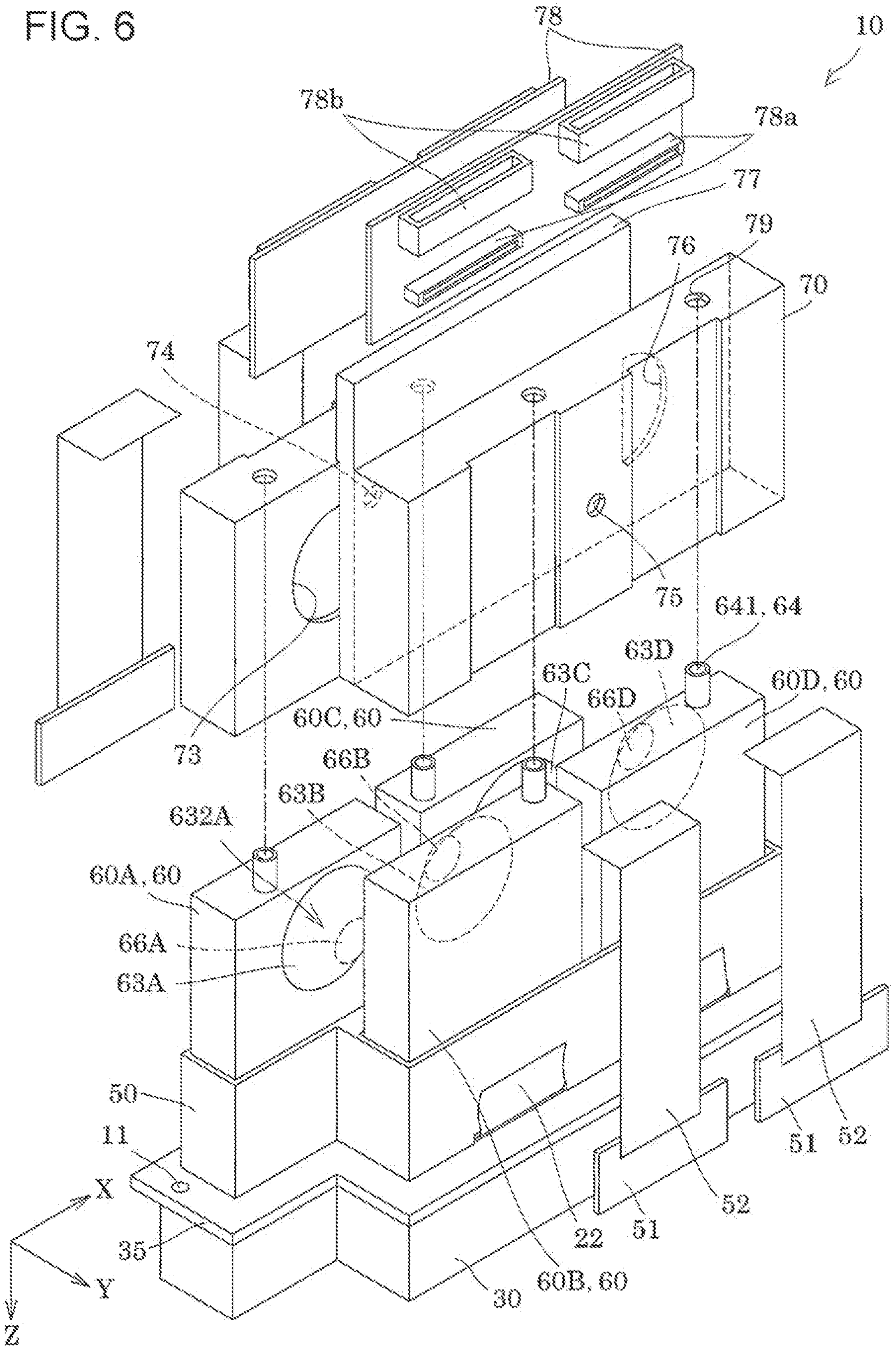
FIG. 6 is an exploded perspective view of the recording head.
Figure 8:
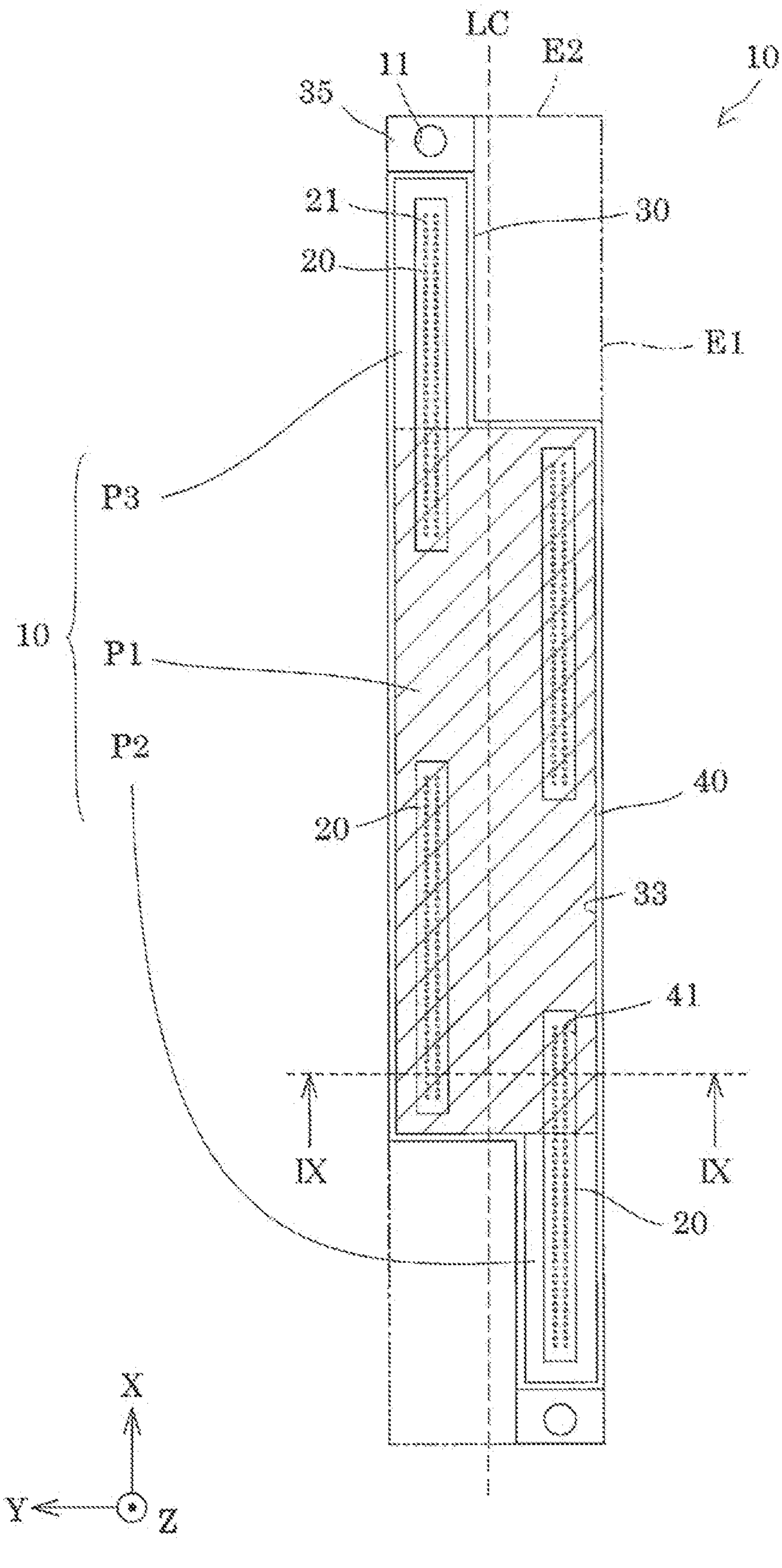
FIG. 8 is a plan view of the recording head.
Figure 9:
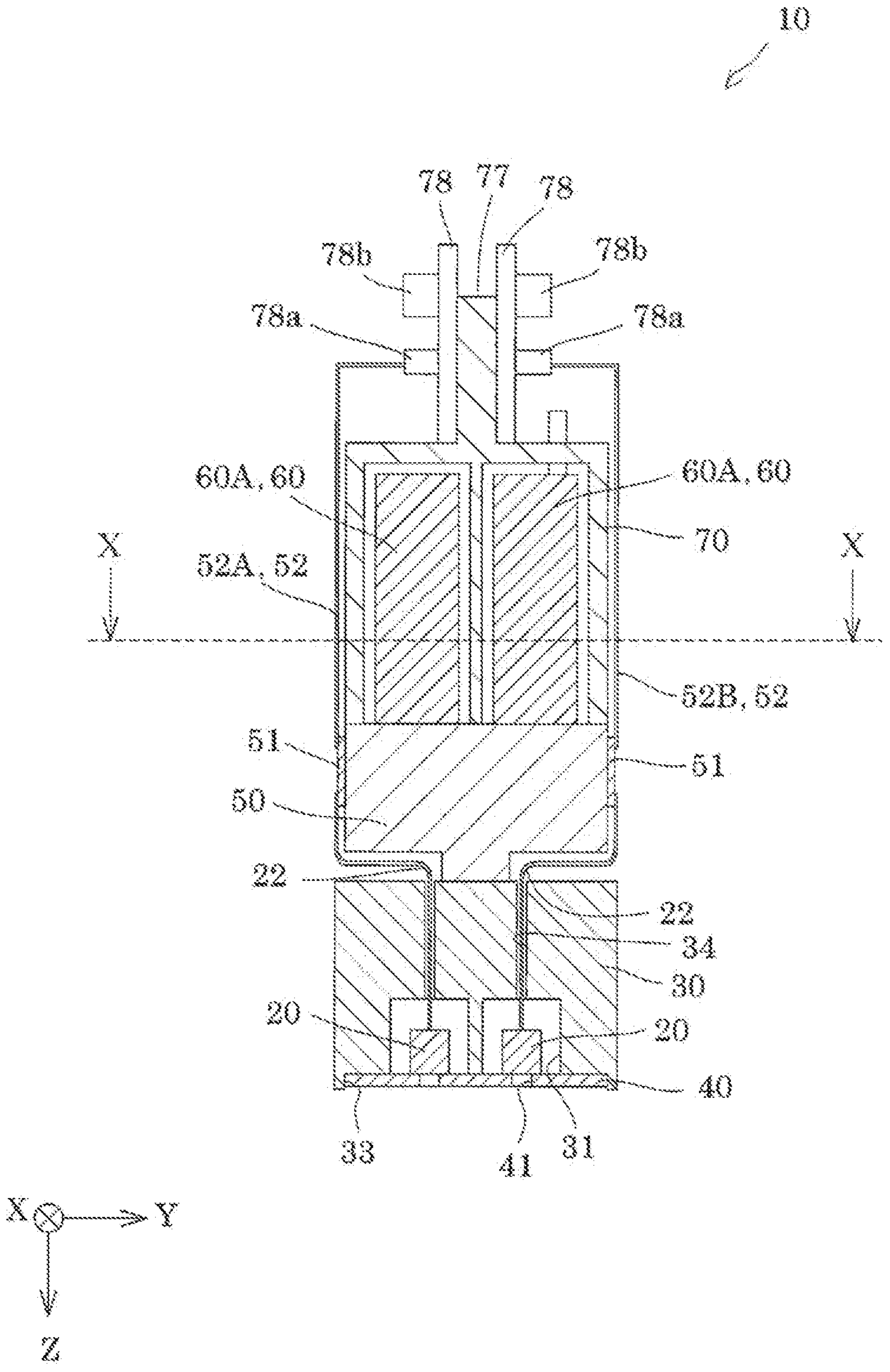
FIG. 9 is a cross-sectional view of the recording head.
Figure 10:
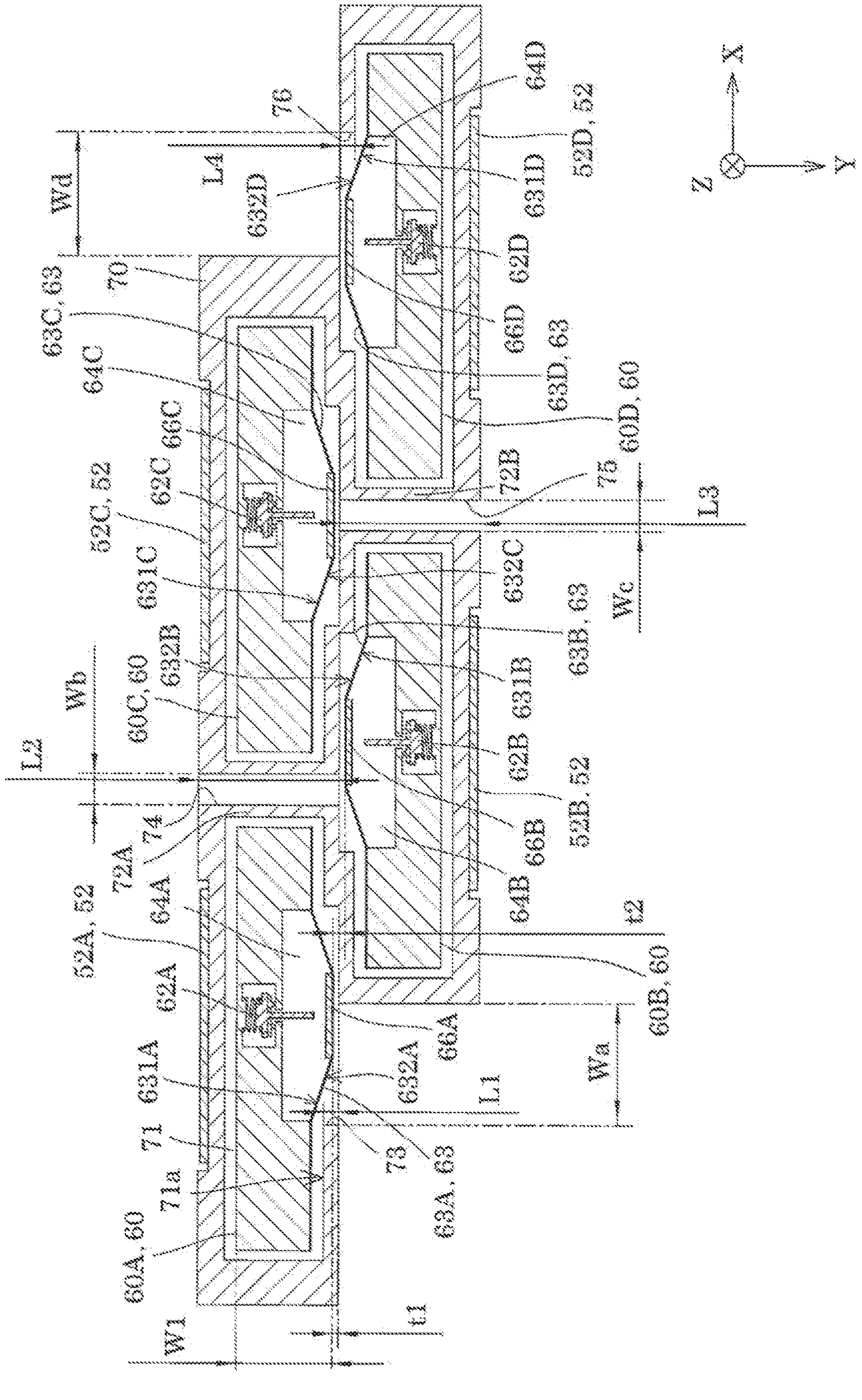
FIG. 10 is a cross-sectional view of the recording head.

The head unit 1 will be described with reference to FIGS. 3 to 10. It should be noted that FIG. 3 is an exploded perspective view of the supply member 2 and the head unit 1. FIG. 4 is a plan view of the head unit 1 as viewed in the +Z direction. FIG. 5 is a perspective view of the recording head 10. FIGS. 6 and 7 are exploded perspective views of the recording head 10. FIG. 8 is a plan view of the recording head 10 as viewed in the −Z direction. FIG. 9 is a cross-sectional view taken along the line IX-IX of FIG. 8. FIG. 10 is a cross-sectional view taken along the line X-X of FIG. 9.

As shown in FIGS. 3 and 4, the head unit 1 includes the plurality of recording heads 10 and a support 3 that supports the plurality of recording heads 10.

The support 3 is formed of a plate-shaped member, and is provided with support holes 3*a* for holding a plurality of recording heads 10. In the present embodiment, the support holes 3*a* are provided independently for each recording head 10. Of course, the support holes 3*a* may be continuously provided over the plurality of recording heads 10.

An ejection surface of the recording head 10 is held in the support hole 3*a* of the support 3 in a state of protruding from the +Z direction side of the support 3. It should be noted that, in the present embodiment, the surface of the recording head 10 facing the medium S is referred to as the ejection surface.

As shown in FIG. 4, there are the plurality of recording heads 10 held by such a support 3 along the X axis, in the present embodiment, two rows each having three recording heads 10 arranged side by side are provided along the Y axis. That is, six recording heads 10 are held on one support 3.

Each recording head 10 is provided with fixing holes 11 at both end portions in the +X direction and the −X direction. The support 3 is provided with a screw hole 3*b* for fixing each recording head 10, and a screw 12 is inserted into the fixing hole 11 and screwed into the screw hole 3*b*, so that each recording head 10 is fixed to the support 3.

Here, as shown in FIGS. 5 to 10, the recording head 10 includes a plurality of liquid ejecting sections 20 having the nozzles 21 that eject the ink, a holder 30 that holds the plurality of liquid ejecting sections 20, a fixing plate 40 that fixes the plurality of liquid ejecting sections 20, a flow path member 50 that supplies the ink to the liquid ejecting section 20, a valve unit 60 that supplies the ink to the flow path member 50, and a cover 70 that accommodates the valve unit.

As shown in FIG. 8, the nozzles 21 that eject the ink are arranged side by side along the X axis in the liquid ejecting section 20. In addition, the liquid ejecting section 20 is provided with, along the Y axis, a plurality of rows of the nozzles 21 arranged side by side along the X axis, and two rows in the present embodiment.

A flow path that communicates with the nozzle 21 and a pressure generation unit that causes a pressure change in the ink in the flow path are provided in an inside (not shown) of the liquid ejecting section 20. As the pressure generation unit, for example, a unit that changes a volume of the flow path by the deformation of a piezoelectric actuator having a piezoelectric material exhibiting an electromechanical conversion function, causing the pressure change in the ink in the flow path, and ejects the ink droplets from the nozzle 21 can be used. In addition, as other pressure generation unit, a unit in which a heat generation element is disposed in the flow path to eject the ink droplets from the nozzle 21 by bubbles generated due to the heat of the heat generation element, or a so-called electrostatic actuator that generates an electrostatic force between a vibration plate and an electrode, deforms the vibration plate by the electrostatic force, and ejects the ink droplets from the nozzle 21 can be used. It should be noted that the surface of the liquid ejecting section 20 on which the nozzle 21 is open is a nozzle surface. That is, the ejection surface of the head unit 1 includes the nozzle surface on which the nozzle 21 is formed.

In addition, a wiring substrate 22 coupled to an internal pressure generation unit (not shown) is derived from the surface of the liquid ejecting section 20 on the −Z direction side. As the wiring substrate 22, a flexible sheet-like material, for example, a so-called flexible substrate, such as a COF substrate, can be used. In addition, for example, on the wiring substrate 22, a switching element that drives the pressure generation unit may or may not be mounted. That is, the wiring substrate 22 may be flexible wiring, such as FFC or FPC.

As shown in FIGS. 7, 8, and 9, the holder 30 holds the plurality of liquid ejecting sections 20. Specifically, an accommodation section 31 is provided on the surface of the holder 30 in the +Z direction. The accommodation section 31 has a recessed shape that is open on the surface in the +Z direction, and accommodates a plurality of liquid ejecting sections 20 fixed by the fixing plate 40. In addition, an opening of the accommodation section 31 is covered with the fixing plate 40. That is, the liquid ejecting section 20 is accommodated inside a space constituted by the accommodation section 31 and the fixing plate 40. The accommodation section 31 is independently provided for each liquid ejecting section 20. Of course, the accommodation section 31 may be continuously provided over the plurality of liquid ejecting sections 20. In addition, the surface of the liquid ejecting section 20 on the −Z direction side is adhered to a bottom portion of the accommodation section 31, that is, the surface of an inner surface of the accommodation section 31 on the −Z direction side with an adhesive.

In such a holder 30, the liquid ejecting sections 20 are disposed in a staggered manner along the X axis. Here, disposing the liquid ejecting sections 20 in a staggered manner along the X axis means that the liquid ejecting sections 20 arranged side by side along the X axis are disposed to be alternately displaced from the Y axis. That is, two rows of the liquid ejecting sections 20 arranged side by side along the X axis are arranged side by side along the Y axis, and two rows of the liquid ejecting sections 20 are disposed to deviate by half a pitch along the X axis. By disposing the liquid ejecting sections 20 in a staggered manner along the X axis in this way, the nozzles 21 of two liquid ejecting sections 20 can be partially overlapped along the X axis to form a continuous row of the nozzles 21 in the direction along the X axis.

In addition, a recess portion 33 having a recessed shape in which the fixing plate 40 is fixed is provided on the surface of the holder 30 on the +Z direction side on which the accommodation section 31 is provided. The recess portion 33 has an opening of a size and a shape in which the fixing plate 40 is fitted and fixed. The fixing plate 40 is constituted by a plate-shaped member, and is fixed in the recess portion 33 of the holder 30 with an adhesive or the like. The fixing plate 40 is provided with an exposure opening portion 41 that exposes the nozzle 21 of each liquid ejecting section 20. In the present embodiment, the exposure opening portion 41 is provided independently for each liquid ejecting section 20. It should be noted that a periphery portion of the exposure opening portion 41 of the fixing plate 40 is fixed to the nozzle 21 side of the liquid ejecting section 20, that is, the surface on the +Z direction side with an adhesive or the like. The surface of the fixing plate 40 in the +Z direction constitutes a part of the ejection surface.

In addition, inside the holder 30, a flow path for flowing the ink may be provided between the liquid ejecting section 20 and the flow path member 50. Of course, a flow path of the flow path member 50 and a flow path of the liquid ejecting section 20 may directly communicate with each other without passing through the holder 30.

In addition, the holder 30 is provided with a wiring insertion hole 34 into which the wiring substrate 22 of the liquid ejecting section 20 is inserted. The wiring insertion hole 34 is provided to be open on a bottom surface of the accommodation section 31, that is, on the surface of the accommodation section 31 on the −Z direction side, and also to be open on the surface of the holder 30 on the −Z direction side.

A pair of flange portions 35 protruding in the +X direction and the −X direction, respectively, are provided on the −Z direction side of the holder 30. The fixing hole 11 into which the screw 12 described above is inserted is provided to penetrate the flange portion 35 in the +Z direction.

Here, a shape of the recording head 10 in a plan view as viewed in the −Z direction will be described with reference to FIG. 8. The recording head 10 includes a first portion P1 (portion shown by hatching in FIG. 8), a second portion P2, and a third portion P3.

When a rectangle having the minimum area including the recording head 10 is denoted by R, a long side E1 of the rectangle R overlaps with a side along the +X direction of the holder 30, and a short side E2 of the rectangle R overlaps with a side along the +Y direction of the holder 30. A center line parallel to the long side E1 of such an imaginary rectangle R is denoted by LC.

The first portion P1 is a rectangular portion through which the center line LC passes. The second portion P2 is a rectangular portion protruding from the first portion P1 in the −X direction. The third portion P3 is a rectangular portion protruding from the first portion P1 in the +X direction. That is, the second portion P2, the first portion P1, and the third portion P3 are arranged in this order along the X axis in the +X direction.

The second portion P2 and the third portion P3 are positioned in opposite directions along the Y axis with the center line LC interposed therebetween. Moreover, the plurality of recording heads 10 are arranged along the X axis such that the second portion P2 of one recording head 10 and the third portion P3 of the other recording head 10 face each other in the direction of the Y axis. In this way, by disposing the second portion P2 of one recording head 10 and the third portion P3 of the other recording head 10 to face each other in the direction of the Y axis, the nozzles 21 of the recording heads 10 adjacent to each other along the X axis can be partially overlapped along the X axis to form a continuous row of the nozzles 21 over the X axis. It should be noted that the second portion P2 and the third portion P3 have a width along the Y axis that does not pass through the center line LC. Therefore, when the plurality of recording heads 10 are arranged along the X axis, the width in the direction along the Y axis occupied by the plurality of recording heads 10 is further narrowed, and the size of the head unit 1 can be reduced in the direction along the Y axis.

As shown in FIGS. 5 to 10, the flow path member 50 is fixed to the surface of the holder 30 on the −Z direction side. A flow path for supplying the ink to the liquid ejecting section 20 is provided inside the flow path member 50 (not shown), and the ink supplied from the liquid storage section 4 is supplied to the flow path member 50 via the valve unit 60 and is supplied from the flow path member 50 to each liquid ejecting section 20. It should be noted that the flow path provided inside the flow path member 50 may be branched. In addition, a filter or the like for removing foreign substances, such as air bubbles, contained in the ink may be provided in the middle of the flow path of the flow path member 50.

In addition, the valve unit 60 and the cover 70 are provided on the surface of the flow path member 50 in the −Z direction. A plurality of valve units 60 are provided in accordance with the number of the liquid ejecting sections 20. That is, in the present embodiment, since one recording head 10 is provided with four liquid ejecting sections 20, four valve units 60 are also provided in accordance with the number of the liquid ejecting sections 20. It should be noted that the number of the valve units 60 and the number of the liquid ejecting sections 20 do not necessarily have to match. Similar to the liquid ejecting section 20, four valve units 60 are provided with two rows each having two valve units 60 arranged side by side along the X axis on the Y axis. Two rows of the liquid ejecting sections 20 provided on the Y axis are disposed at positions deviating from each other along the X axis. In the present embodiment, among the four valve units 60, in the recording head 10, the valve unit 60 positioned relatively in the −X direction and the −Y direction is referred to as a first valve unit 60A, and the valve unit 60 positioned on the −X direction and the +Y direction side is referred to as a second valve unit 60B. In addition, in the recording head 10, among the four valve units 60, the valve unit 60 positioned relatively in the +X direction and the −Y direction is referred to as a third valve unit 60C, and the valve unit 60 positioned on the +X direction and the +Y direction side is referred to as a fourth valve unit 60D. In the following, the first valve unit 60A, the second valve unit 60B, the third valve unit 60C, and the fourth valve unit 60D are referred to as the valve unit 60 when the distinction is necessary.

Figure 11:
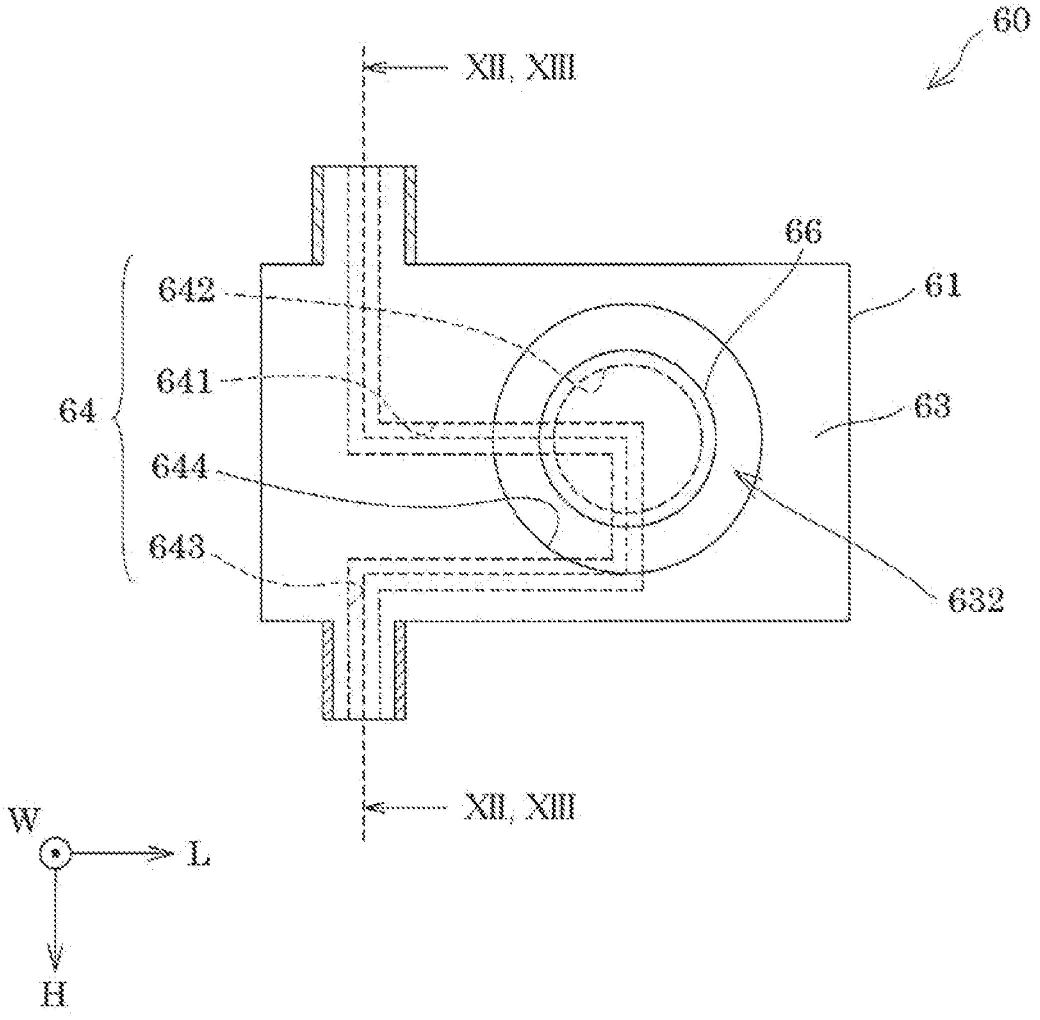
FIG. 11 is a side view of a valve unit.
Figure 12:
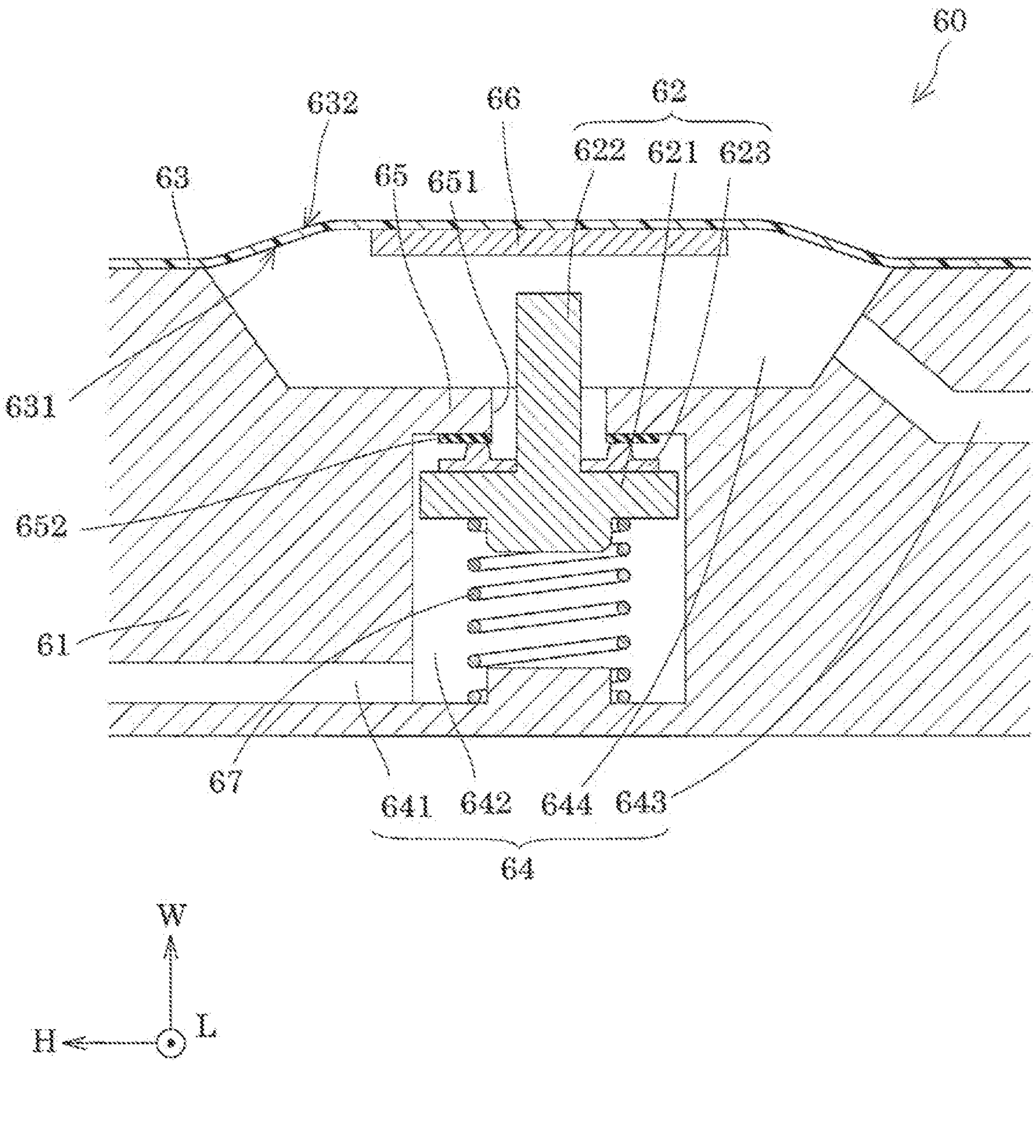
FIG. 12 is a cross-sectional view of the valve unit.
Figure 13:
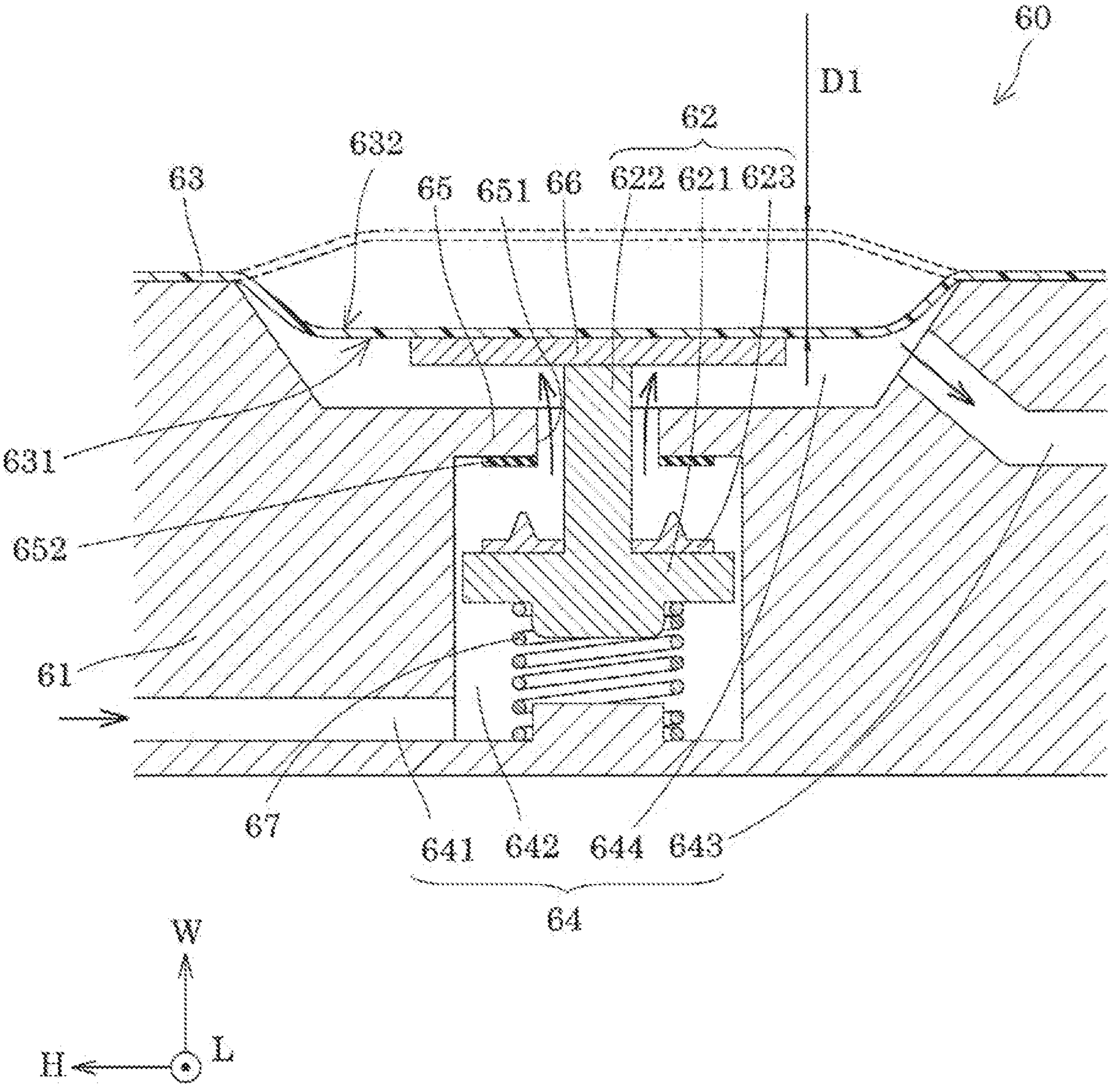
FIG. 13 is a cross-sectional view of the valve unit.

Here, the valve unit 60 will be described with reference to FIGS. 11 to 13. It should be noted that FIG. 11 is a side view of the valve unit 60 as viewed in the −W direction. FIGS. 12 and 13 are cross-sectional views taken along the lines XII-XII and XIII-XIII of FIG. 11. In addition, FIG. 12 shows a valve closed state, and FIG. 13 shows a valve open state. Further, in FIGS. 11 to 13, L, W, and H represent three spatial axes orthogonal to each other. In the present specification, the directions along these axes are referred to as an L direction, a W direction, and an H direction. In the description, a direction in which an arrow in each figure is directed is referred to as a positive (+) direction, and an opposite direction of the arrow is referred to as a negative (−) direction.

The valve unit 60 closes an internal valve to prevent the ink from being supplied to the liquid ejecting section side when the pressure on the liquid ejecting section 20 side is equal to or higher than a predetermined pressure, and opens the internal valve to supply the ink supplied from the liquid storage section to the liquid ejecting section side when the pressure on the liquid ejecting section side is lower than the predetermined pressure. The valve unit 60 can also be referred to as a “self-sealing valve” or a “differential pressure valve”. The valve unit 60 also plays a role of partitioning a negative pressure state in the liquid ejecting section and a positive pressure state on the liquid supply section side such that a pressurizing force does not directly act on the liquid ejecting section in a negative pressure state from the liquid storage section.

As shown in FIGS. 11 to 13, the valve unit 60 includes a valve unit main body 61, a valve body 62, and a flexible film 63. In addition, the valve unit 60 has a valve unit flow path 64 that communicates with the liquid storage section 4 and the liquid ejecting section 20. The valve unit flow path 64 includes a supply path 641 coupled to the liquid storage section 4, a liquid supply chamber 642 coupled to the supply path 641, a discharge path 643 coupled to the liquid ejecting section 20 side, and a pressure chamber 644 coupled to the discharge path. The liquid supply chamber 642 and the pressure chamber 644 are arranged side by side in this order in the +W direction, and the liquid supply chamber 642 and the pressure chamber 644 are partitioned by a flow path partition wall 65. The flow path partition wall 65 is formed with a communication hole 651 that communicates the liquid supply chamber 642 and the pressure chamber 644. That is, the ink from the liquid storage section 4 is supplied to the liquid supply chamber 642 via the supply path 641. In addition, the ink in the liquid supply chamber 642 is supplied to the pressure chamber 644 via the communication hole 651. Moreover, the ink in the pressure chamber 644 is supplied to the liquid ejecting section 20 via the discharge path 643.

The pressure chamber 644 has a recessed shape that is open on the surface of the valve unit main body 61 in the +W direction. The pressure chamber 644 is sealed by the flexible film 63 fixed to the surface of the valve unit main body 61. That is, the flexible film 63 defines a part of the pressure chamber 644. For the flexible film 63, a flexible material having resistance to the ink can be used. In addition, as the flexible film 63, it is preferable to use a material having a low water permeability or a low gas permeability of liquid oxygen, nitrogen, or the like. Examples of the material of the flexible film 63 include a configuration in which a nylon film coated with vinylidene chloride (Saran) is adhered and laminated to a high-density polyethylene film or a polypropylene (PP) film. In addition, polyethylene terephthalate (PET) or the like may be used as another material of the flexible film 63. In addition, as a method of joining the flexible film 63 to the valve unit main body 61, for example, heat welding, vibration welding, adhesion with an adhesive or the like can be used.

An inner surface of the pressure chamber 644 defined by the flexible film 63, that is, the surface on the −W direction side is referred to as an inner surface 631, and the surface of the flexible film 63 opposite to the inner surface 631, that is, the surface on the +W direction side is referred to as an outer surface 632 in contact with the atmosphere. It should be noted that the inner surface 631 of the flexible film 63 refers to a portion of the flexible film 63 that defines the pressure chamber 644, that is, a portion that overlaps with an opening of the pressure chamber 644 in the +W direction. In addition, the outer surface 632 of the flexible film 63 means a portion that overlaps with the inner surface 631 as viewed in the −W direction. That is, the inner surface 631 and the outer surface 632 of the flexible film 63 refer to a so-called diaphragm region that is displaced due to the differential pressure between the inside and the outside of the pressure chamber 644. It should be noted that the flexible film 63 is joined to the valve unit main body 61 on the outside of the inner surface 631. In addition, the flexible film 63 can be displaced in the −W direction toward the inner surface 631 from the outer surface 632 and in the +W direction opposite to the −W direction.

Further, a pressure reception plate 66 is disposed on the inner surface 631 of the flexible film 63. The pressure reception plate 66 is made of a material having a Young's modulus higher than the flexible film 63, for example, a thin plate, such as SUS, or a resin. In the present embodiment, the pressure reception plate 66 is constituted by a plate-shaped member having an outer diameter smaller than the inner surface 631 of the flexible film 63, and is joined to the inner surface of the flexible film 63, that is, the region that defines the pressure chamber 644. Therefore, the pressure reception plate 66 can be moved in the +W direction and the −W direction in accordance with the bending deformation of the flexible film 63. It should be noted that the pressure reception plate 66 is not particularly limited to this, and one end of the pressure reception plate 66 may be supported at a joint portion between the valve unit main body 61 and the flexible film 63. That is, the pressure reception plate 66 may be bent and deformed like a plate spring. When one end of the pressure reception plate 66 is supported between the valve unit main body 61 and the flexible film 63 in this way, the pressure reception plate 66 and the flexible film 63 may or may not be joined.

The valve body 62 has a base end portion 621 accommodated in the liquid supply chamber 642, a shaft portion 622 protruding from the base end portion 621 through the communication hole 651 to the pressure chamber 644 side, and an elastic member 623 provided on the +W direction side of the base end portion 621. The base end portion 621 has a substantially disk-shaped shape, and is larger than the outer diameter in a cross section perpendicular to the +W direction of the shaft portion. The base end portion 621 can also be referred to as a flange portion. The shaft portion 622 passes through the communication hole 651 formed in the flow path partition wall 65, and a distal end portion thereof is positioned in the pressure chamber 644. The distal end portion of the shaft portion 622 can come into contact with the flexible film 63 that defines a part of the pressure chamber 644 via the pressure reception plate 66. The ink in the liquid supply chamber 642 flows into the pressure chamber 644 through an interval between the shaft portion 622 and the inner surface of the communication hole 651. The elastic member 623 is provided inside the outer circumferences of the base end portion 621 and outside the shaft portion 622 as viewed in the −W direction. A protrusion is formed on the +W direction side of the elastic member 623 at a portion coming in contact with a valve seat 652.

The valve seat 652 having an annular shape is provided around the communication hole 651 on the surface of the flow path partition wall 65 on the liquid supply chamber 642 side in the −W direction. The valve seat 652 is a sealing portion that blocks the communication hole 651 by coming into contact with the elastic member 623 provided on the valve body 62. The valve seat 652 according to the present embodiment is separate from the flow path partition wall 65, and is formed of, for example, a metal, such as SUS or titanium. In addition, the surface of the valve seat 652 coming into contact with the elastic member 623 in the −W direction may be subjected to liquid repellent treatment, such as a fluorine coating.

In the liquid supply chamber 642, a coil spring 67, which is an example of an urging member, is interposed between the base end portion 621 of the valve body 62 and the valve unit main body 61 that defines the inner surface of the liquid supply chamber 642 in the −W direction. The valve body 62 is urged by the coil spring 67 in the +W direction. It should be noted that, as the urging member, for example, a plate spring or a disk spring can be used in addition to the coil spring 67. In addition, the pressure chamber 644 may be provided with the urging member, such as the coil spring, that urges the flexible film 63 with respect to the valve unit main body 61 in the +W direction.

An opening/closing operation of the valve unit 60 configured as described above will be described. In the following description, a state is assumed in which the liquid supply chamber 642 and the pressure chamber 644 are filled with the ink by the initial filling of the nozzle 21 with the ink or the previous ejection of the ink. As shown in FIG. 12, the coil spring 67 urges the valve body 62 in the +W direction, which is the direction in which the valve body 62 is always in the valve closed state. In the valve closed state in which the valve body 62 is positioned in the +W direction, the elastic member 623 is in a state of coming into contact with the valve seat 652 to block the communication hole 651, that is, the liquid supply chamber 642 and the pressure chamber 644 are in a non-communication state. In the present embodiment, a position of the valve body 62 at which the valve unit flow path 64 is closed is referred to as a closing position. At the closing position of the valve body 62, the distal end of the shaft portion 622 of the valve body 62 may or may not come into contact with the pressure reception plate 66.

In the non-communication state of the liquid supply chamber 642 and the pressure chamber 644, when the ink is ejected from the liquid ejecting section 20, the ink in the pressure chamber 644 is decreased. As a result, as shown in FIG. 13, the inside of the pressure chamber 644 has a negative pressure due to the differential pressure with the pressure on the outer surface 632 side of the flexible film 63, that is, the atmospheric pressure, and the flexible film 63 and the pressure reception plate 66 are displaced to bend in the −W direction on the liquid supply chamber 642 side. Then, the pressure reception plate 66 pushes the distal end of the shaft portion 622 in the −W direction, and the valve body 62 is pushed down to the liquid supply chamber 642 side against the urging force of the coil spring 67. As a result, the elastic member 623 is separated from the valve seat 652 due to the movement of the valve body 62 in the −W direction, and the valve body 62 is in the valve open state. Moreover, when the valve body 62 is in the valve open state, it is a state in which the communication hole 651 is open, that is, the valve open state in which the liquid supply chamber 642 and the pressure chamber 644 communicate with each other. In the present embodiment, the position of the valve body 62 at which the valve unit flow path 64 is opened is referred to as an opening position. That is, the valve body 62 is moved between the closing position and the opening position due to the displacement of the flexible film 63. At the opening position of the valve body 62, the distal end of the shaft portion 622 of the valve body 62 comes into contact with the pressure reception plate 66.

When the valve body 62 is in the valve open state, the ink in the liquid supply chamber 642 flows into the pressure chamber 644 via the communication hole 651. When the pressure chamber 644 is sufficiently replenished with the ink, the negative pressure in the pressure chamber 644 is eliminated, the flexible film 63 and the pressure reception plate 66 return to original positions thereof, and the valve body 62 is in the valve closed state due to the urging force of the coil spring 67 as shown in FIG. 12. By the opening/closing operation of the valve body 62 in this way, the ink in the pressure chamber 644 is adjusted such that the pressure is always substantially fixed.

Four such valve units 60 are disposed in the recording head 10. Here, the disposition of the valve unit 60 disposed in the recording head 10 with respect to the support 3 will be mainly described with reference to FIG. 10.

The first valve unit 60A is disposed such that the +H direction matches the −Z direction, the +W direction matches the +Y direction, and the +L direction matches the +X direction, with respect to the flow path member 50. In such a first valve unit 60A, the valve unit flow path 64 of the valve unit 60 described above is a "first flow path 64A" that communicates with the liquid ejecting section 20. In addition, the flexible film 63 of the valve unit 60 is a "first flexible film 63A" in the first valve unit 60A. In addition, the pressure reception plate 66 of the valve unit 60 is a "first pressure reception plate 66A" in the first valve unit 60A. In addition, the valve body 62 of the valve unit 60 is a "first valve body 62A" in the first valve unit 60A. Moreover, the inner surface 631 of the first flexible film 63A in the first valve unit 60A is a "first inner surface 631A", and the outer surface 632 of the first flexible film 63A is a "first outer surface 632A". The −W direction from the first outer surface 632A to the first inner surface 631A matches the −Y direction. In the following, the first direction from the first outer surface 632A to the first inner surface 631A will be described as the −Y direction. In addition, the +W direction, which is the opposite direction to the −W direction, matches the +Y direction. In the following, the second direction will be described as the +Y direction. Further, the third direction orthogonal to the −Y direction, which is the first direction, is the direction along the X axis and the direction along the Z axis, but in the present embodiment, the third direction is the +X direction orthogonal to the +Z direction, which is the ejection direction. In the following, in the present embodiment, the third direction will be described as the +X direction.

In the second valve unit 60B, the +H direction matches the −Z direction, the +W direction matches the −Y direction, and the +L direction matches the −X direction, with respect to the flow path member 50. That is, the second valve unit 60B is disposed such that the valve unit 60 is rotated 180 degrees with respect to the first valve unit 60A about an imaginary axis along the +H direction. In such a second valve unit 60B, the valve unit flow path 64 of the valve unit 60 described above is a "second flow path 64B" that communicates with the liquid ejecting section 20. In addition, the flexible film 63 of the valve unit 60 is a "second flexible film 63B" in the second valve unit 60B. In addition, the pressure reception plate 66 of the valve unit 60 is a "second pressure reception plate 66B" in the second valve unit 60B. In addition, the valve body 62 of the valve unit 60 is a "second valve body 62B" in the second valve unit 60B. Moreover, the inner surface 631 of the second flexible film 63B in the second valve unit 60B is a "second inner surface 631B", and the outer surface 632 of the second flexible film 63B is a "second outer surface 632B". Such a second valve unit 60B is disposed such that the direction from the second outer surface 632B to the second inner surface 631B is the +Y direction, which is the second direction, and the direction from the second inner surface 631B to the second outer surface 632B is the −Y direction, which is the first direction.

The third valve unit 60C is held by the flow path member 50 in the same posture as the first valve unit 60A. That is, the third valve unit 60C is disposed such that the +H direction matches the −Z direction, the +W direction matches the +Y direction, and the +L direction matches the +X direction, with respect to the flow path member 50. In such a third valve unit 60C, the valve unit flow path 64 of the valve unit 60 is a "third flow path 64C" that communicates with the liquid ejecting section 20. In addition, the flexible film 63 of the valve unit 60 is a "third flexible film 63C" in the third valve unit 60C. In addition, the pressure reception plate 66 of the valve unit 60 is a "third pressure reception plate 66C" in the third valve unit 60C. In addition, the valve body 62 of the valve unit 60 is a "third valve body 62C" in the third valve unit 60C. Moreover, the inner surface 631 of the third flexible film 63C in the third valve unit 60C is a "third inner surface 631C", and the outer surface 632 of the third flexible film 63C is a "third outer surface 632C". Such a third valve unit 60C is disposed such that the direction from the third outer surface 632C to the third inner surface 631C is the −Y direction, which is the first direction, and the direction from the third inner surface 631C to the third outer surface 632C is the +Y direction, which is the second direction.

The fourth valve unit 60D is held by the flow path member 50 in the same posture as the second valve unit 60B. That is, in the fourth valve unit 60D, the +H direction matches the −Z direction, the +W direction matches the −Y direction, and the +L direction matches the −X direction, with respect to the holder 30. In such a fourth valve unit 60D, the valve unit flow path 64 of the valve unit 60 described above is a "fourth flow path 64D" that communicates with the liquid ejecting section 20. In addition, the flexible film 63 of the valve unit 60 is a "fourth flexible film 63D" in the fourth valve unit 60D. In addition, the pressure reception plate 66 of the valve unit 60 is a "fourth pressure reception plate 66D" in the fourth valve unit 60D. In addition, the valve body 62 of the valve unit 60 is a "fourth valve body 62D" in the fourth valve unit 60D. Moreover, the inner surface 631 of the fourth flexible film 63D in the fourth valve unit 60D is a "fourth inner surface 631D", and the outer surface 632 of the fourth flexible film 63D is a "fourth outer surface 632D". Such a fourth valve unit 60D is disposed such that the direction from the fourth outer surface 632D to the fourth inner surface 631D is the +Y direction, which is the second direction, and the direction from the fourth inner surface 631D to the fourth outer surface 632D is the −Y direction, which is the first direction.

Here, the first valve unit 60A and the second valve unit 60B are disposed at the same position in the +Z direction as shown in FIGS. 6 and 9. In addition, the second valve unit 60B and the third valve unit 60C are disposed at the same position in the +Z direction. Further, the third valve unit 60C and the fourth valve unit 60D are disposed at the same position in the +Z direction. That is, in the present embodiment, the first valve unit 60A, the second valve unit 60B, the third valve unit 60C, and the fourth valve unit 60D are disposed at the same position in the +Z direction. It should be noted that the fact that two members are disposed at the same position in the +Z direction means that the coordinates of the centers of two members along the Z axis are at the same position on the Z axis. By disposing all the valve units 60 at the same position in the +Z direction in this way, the size of the recording head 10 can be reduced in the +Z direction. Of course, any one or a plurality of two or more of the first valve unit 60A, the second valve unit 60B, the third valve unit 60C, and the fourth valve unit 60D may be disposed at different positions in the +Z direction with respect to the others.

In addition, as shown in FIG. 10, the second valve unit 60B is disposed to overlap with a part of the first valve unit 60A as viewed in the −Y direction, which is the first direction, to deviate from the first valve unit 60A in the +Y direction, which is the second direction, and the +X direction, which is the third direction. That is, as viewed in the −Y direction, an end portion of the second valve unit 60B in the −X direction is disposed to overlap with an end portion of the first valve unit 60A in the +X direction. In addition, as viewed in the −Y direction, an end portion of the second valve unit 60B in the +X direction does not overlap with the first valve unit 60A, and an end portion of the first valve unit 60A in the −X direction is disposed at a position that does not overlap with the second valve unit 60B.

In addition, at least a part of the first outer surface 632A of the first valve unit 60A does not overlap with the second valve unit 60B as viewed in the −Y direction. In the present embodiment, the first outer surface 632A and the second valve unit 60B partially overlap with each other as viewed in the −Y direction. That is, in the present embodiment, as viewed in the −Y direction, an end portion of the first outer surface 632A in the +X direction overlaps with the second valve unit 60B, and an end portion thereof in the −X direction does not overlap with the second valve unit 60B. Of course, the first outer surface 632A and the second valve unit 60B may be disposed at positions that do not completely overlap with each other as viewed in the −Y direction. It should be noted that, by disposing the first outer surface 632A and the second valve unit 60B to partially overlap with each other as viewed in the −Y direction, the size of the recording head 10 can be reduced in the +X direction.

Further, at least a part of the second outer surface 632B of the second valve unit 60B does not overlap with the first valve unit 60A as viewed in the +Y direction. In the present embodiment, the second outer surface 632B and the first valve unit 60A partially overlap with each other as viewed in the +Y direction. That is, in the present embodiment, as viewed in the +Y direction, an end portion of the second outer surface 632B in the −X direction overlaps with the first valve unit 60A, and an end portion thereof in the +X direction does not overlap with the second valve unit 60B. Of course, the second outer surface 632B and the first valve unit 60A may be disposed not to completely overlap with each other as viewed in the +Y direction. It should be noted that, by disposing the second outer surface 632B and the first valve unit 60A to partially overlap with each other as viewed in the +Y direction, the size of the recording head 10 can be reduced in the +X direction.

In addition, at least a part of the second outer surface 632B of the second valve unit 60B does not overlap with the third valve unit 60C as viewed in the +Y direction. In the present embodiment, the second outer surface 632B and the third valve unit 60C partially overlap with each other as viewed in the +Y direction. That is, in the present embodiment, as viewed in the +Y direction, an end portion of the second outer surface 632B in the +X direction overlaps with the third valve unit 60C, and an end portion thereof in the −X direction does not overlap with the third valve unit 60C. Of course, the second outer surface 632B and the third valve unit 60C may be disposed not to completely overlap with each other as viewed in the +Y direction. It should be noted that, by disposing the second outer surface 632B and the third valve unit 60C to partially overlap with each other as viewed in the +Y direction, the size of the recording head 10 can be reduced in the +X direction.

That is, the second outer surface 632B of the second flexible film 63B of the second valve unit 60B overlaps with both the first valve unit 60A and the third valve unit 60C as viewed in the +Y direction.

The third valve unit 60C is disposed in the +X direction, which is the third direction, with respect to the first valve unit 60A. In the present embodiment, the first valve unit 60A and the third valve unit 60C are disposed at the same position in the +Y direction and different positions in the +X direction. That is, the first valve unit 60A is disposed in the −X direction with respect to the third valve unit 60C, and the third valve unit 60C is disposed in the +X direction with respect to the first valve unit 60A. Of course, the first valve unit 60A and the third valve unit 60C may be disposed to deviate from each other in the direction along the Y axis. It should be noted that, by disposing the first valve unit 60A and the third valve unit 60C at positions that at least partially overlap with each other as viewed in the +X direction, the size of the recording head 10 can be reduced in the +Y direction.

In addition, the third valve unit 60C is disposed to overlap with a part of the second valve unit 60B as viewed in the +Y direction, which is the second direction. That is, the third valve unit 60C is disposed such that a part of the third valve unit 60C in the −X direction and a part of the second valve unit 60B in the +X direction overlap with each other as viewed in the +Y direction.

In addition, a part of the third outer surface 632C of the third valve unit 60C does not overlap with the second valve unit 60B as viewed in the −Y direction. In the present embodiment, the third outer surface 632C and the second valve unit 60B partially overlap with each other as viewed in the −Y direction. That is, in the present embodiment, as viewed in the −Y direction, an end portion of the third outer surface 632C in the −X direction overlaps with the second valve unit 60B and an end portion thereof in the +X direction does not overlap with the second valve unit 60B. Of course, the third outer surface 632C and the second valve unit 60B may be disposed not to completely overlap with each other as viewed in the −Y direction. It should be noted that, by disposing the third outer surface 632C and the second valve unit 60B to partially overlap with each other as viewed in the +X direction, the size of the recording head 10 can be reduced in the +Y direction.

In addition, the third valve unit 60C is disposed to overlap with a part of the fourth valve unit 60D as viewed in the +Y direction. That is, the third valve unit 60C is disposed such that a part of the third valve unit 60C in the +X direction and a part of the fourth valve unit 60D in the −X direction overlap with each other as viewed in the +Y direction.

In addition, at least a part of the third outer surface 632C of the third valve unit 60C does not overlap with the fourth valve unit 60D as viewed in the −Y direction. In the present embodiment, the third outer surface 632C and the fourth valve unit 60D partially overlap with each other as viewed in the −Y direction. That is, in the present embodiment, as viewed in the −Y direction, an end portion of the third outer surface 632C in the +X direction overlaps with the fourth valve unit 60D and an end portion thereof in the −X direction does not overlap with the fourth valve unit 60D. Of course, the third outer surface 632C and the fourth valve unit 60D may be disposed not to completely overlap with each other as viewed in the +X direction. It should be noted that, by disposing the third outer surface 632C and the fourth valve unit 60D to partially overlap with each other as viewed in the −Y direction, the size of the recording head 10 can be reduced in the +Y direction.

That is, the third outer surface 632C of the third valve unit 60C overlaps with the second valve unit 60B and the fourth valve unit 60D as viewed in the −Y direction.

The fourth valve unit 60D is disposed in the +Y direction, which is the third direction, with respect to the second valve unit 60B. In the present embodiment, the second valve unit 60B and the fourth valve unit 60D are disposed at the same position in the +Y direction and different positions in the +X direction. That is, the second valve unit 60B is disposed in the −X direction with respect to the fourth valve unit 60D, and the fourth valve unit 60D is disposed in the +X direction with respect to the second valve unit 60B. Of course, the second valve unit 60B and the fourth valve unit 60D may be disposed to deviate from each other in the direction along the Y axis. It should be noted that, by disposing the second valve unit 60B and the fourth valve unit 60D at positions that at least partially overlap with each other as viewed in the +X direction, so that the size of the recording head 10 can be reduced in the +Y direction.

In addition, the fourth valve unit 60D is disposed to overlap with a part of the third valve unit 60C as viewed in the +Y direction, which is the second direction, as described above. That is, the fourth valve unit 60D is disposed such that a part of the fourth valve unit 60D in the −X direction and a part of the third valve unit 60C in the +X direction overlap with each other as viewed in the +Y direction.

In addition, at least a part of the fourth outer surface 632D of the fourth valve unit 60D does not overlap with the third valve unit 60C as viewed in the +Y direction. In the present embodiment, the fourth outer surface 632D and the third valve unit 60C partially overlap with each other as viewed in the +Y direction. That is, in the present embodiment, as viewed in the +Y direction, an end portion of the fourth outer surface 632D in the −X direction overlaps with the third valve unit 60C, and an end portion thereof in the +X direction does not overlap with the third valve unit 60C. Of course, the fourth outer surface 632D and the third valve unit 60C may be disposed not to completely overlap with each other as viewed in the +Y direction. It should be noted that, by disposing the fourth outer surface 632D and the third valve unit 60C to partially overlap with each other as viewed in the +Y direction, the size of the recording head 10 can be reduced in the +X direction.

As described above, the four valve units 60 according to the present embodiment are disposed such that, as viewed in the direction along the Y axis, the first outer surface 632A and the second valve unit 60B partially overlap with each other, the second outer surface 632B, and the first valve unit 60A and the third valve unit 60C partially overlap with each other, the third outer surface 632C and the second valve unit 60B and the fourth valve unit 60D partially overlap with each other, and the fourth outer surface 632D and the third valve unit 60C partially overlap with each other. Therefore, as compared with when the outer surface 632 of one valve unit 60 is disposed not to overlap with the other valve unit 60 as viewed in the direction along the Y axis, the size of the recording head 10 in the direction along the X axis can be reduced.

It should be noted that, in the present embodiment, as viewed in the direction along the Z axis, a part of the first valve unit 60A, the second valve unit 60B, the third valve unit 60C, and a part of the fourth valve unit 60D overlap with the first portion P1, a part of the first valve unit 60A overlaps with the second portion P2, and a part of the fourth valve unit 60D overlaps with the third portion P3.

In addition, the four valve units 60 disposed in this way are covered with the cover 70. The cover 70 is fixed to the surface of the flow path member 50 in the −Z direction and covers the valve unit 60 with the flow path member 50. Specifically, the cover 70 is formed with a valve unit accommodation section 71 that is open in the +Z direction. The valve unit accommodation section 71 has a recessed shape that is open on the surface in the +Z direction, and an opening of the valve unit accommodation section 71 in the +Z direction is covered with the flow path member 50. The valve unit accommodation section 71 is provided independently for each valve unit 60, and one valve unit 60 is accommodated in each of the valve unit accommodation sections 71. That is, in the present embodiment, a "housing" that accommodates the liquid ejecting section 20 and the valve unit 60 is constituted by the fixing plate 40, the holder 30, the flow path member 50, and the cover 70. It should be noted that the cover 70 may be divided into two or more portions. In addition, since the valve unit accommodation section 71 is independently provided for each valve unit 60, on the cover 70, the valve unit accommodation section 71 in which the first valve unit 60A is accommodated and the valve unit accommodation section 71 in which the third valve unit 60C is accommodated are partitioned by a first partition wall 72A, which is a partition wall. Similarly, the valve unit accommodation section 71 in which the second valve unit 60B is accommodated and the valve unit accommodation section 71 in which the fourth valve unit 60D is accommodated are partitioned by a second partition wall 72B which is the partition wall.

The cover 70 has a first opening portion 73 formed at a position facing at least a part of the first outer surface 632A of the first valve unit 60A. The first opening portion 73 penetrates the cover 70 along the Y axis to communicate the inside and the outside of the valve unit accommodation section 71. That is, a part of the first outer surface 632A of the first valve unit 60A is exposed to the outside by the first opening portion 73 provided in the cover 70. By exposing the first outer surface 632A of the first flexible film 63A to the outside of the cover 70, that is, the outside of the valve unit accommodation section 71 by the first opening portion 73 in this way, the first flexible film 63A can be pressed from the outside of the cover 70 in the −Y direction, which is the first direction. Therefore, even when the differential pressure between the pressure on the first inner surface 631A side and the pressure on the first outer surface 632A side, that is, the atmospheric pressure of the pressure chamber 644 of the first valve unit 60A is not equal to or higher than the predetermined pressure, the first flexible film 63A can be moved to the −Y direction to move the first valve body 62A to the −X direction, and the valve open state can be obtained in which the liquid supply chamber 642 and the pressure chamber 644 of the first flow path 64A communicate with each other. In the present embodiment, an operation of pressing the outer surface 632 of the flexible film 63 in the valve unit 60 by an external force other than the differential pressure between the inner surface 631 and the outer surface 632 to move the valve body 62 and open the valve is referred to as forcible valve opening.

The forcible valve opening is performed, for example, by so-called initial filling in which the recording head 10 in an empty state in which the ink used for printing is not filled is filled with the ink used for printing, or a cleaning operation of discharging the ink from the nozzle 21. By providing the first opening portion 73 in this way, the first flexible film 63A can be operated from the outside of the cover 70, so that it is not necessary to provide the mechanism that operates the first flexible film 63A inside the cover 70, that is, inside the valve unit accommodation section 71, and the size of the recording head 10 can be reduced, the structure thereof can be simplified, and the forcible valve opening can be easily performed.

It should be noted that, it is preferable that the first opening portion 73 overlap with at least a part of the first valve body 62A as viewed in the −Y direction, which is the first direction. In the present embodiment, a part of the first opening portion 73 on the +X direction side is disposed at a position that overlaps with the −X direction side of the first valve body 62A. By providing the first opening portion 73 to overlap with the first valve body 62A as viewed in the −Y direction in this way, when the first flexible film 63A is pressed in the −Y direction for the forcible valve opening, the movement of the valve body 62 in the −Y direction can be stabilized. By the way, when the forcible valve opening is performed, by pressing the first flexible film 63A at a position as close as possible to the shaft portion 622 of the first valve body 62A, the force applied to the shaft portion 622 in the direction inclined with respect to the Y axis can be decreased, so that the valve body 62 can be stably moved along the Y axis. Therefore, it is further preferable that the first opening portion 73 be disposed to overlap with the shaft portion 622 of the first valve body 62A as viewed in the −Y direction.

In addition, it is preferable that the first opening portion 73 overlap with at least a part of the first pressure reception plate 66A as viewed in the −Y direction, which is the first direction. It should be noted that, when the first opening portion 73 is provided at a position that overlaps with the first pressure reception plate 66A, the first opening portion 73 may or may not overlap with at least a part of the first valve body 62A as viewed in the −Y direction. By providing the first opening portion 73 to overlap with the first pressure reception plate 66A as viewed in the −Y direction in this way, when the first flexible film 63A is pressed in the −Y direction via the first opening portion 73, the pressure reception plate 66 can be pressed, and the movement of the first valve body 62A that is moved by the first pressure reception plate 66A can be stabilized. Therefore, the forcible valve opening can be stably performed.

In addition, as described above, the first valve unit 60A is disposed not to partially overlap with the second valve unit 60B as viewed in the −Y direction. Therefore, the first opening portion 73 can be formed further relatively wide in the −Y direction at a position in the −Y direction of the second valve unit 60B.

In addition, it is preferable that a gap t1 between a portion facing the first outer surface 632A at a position different from the first opening portion 73 on an inner wall surface 71*a* forming the valve unit accommodation section 71 of the cover 70, and the first outer surface 632A be smaller than a dimension W1 of the first valve unit 60A in the −Y direction. In addition, it is further preferable that the gap t1 be smaller than ½ of the dimension W1 of the first valve unit 60A. Here, the gap t1 between the portion facing the first outer surface 632A and the first outer surface 632A on the inner wall surface 71*a* is the minimum dimension in a state in which the first flexible film 63A is most displaced in the +Y direction. In addition, the dimension W1 of the first valve unit 60A in the −Y direction is the maximum dimension in a state in which the first flexible film 63A is most displaced in the +Y direction. By making the gap t1 between the first outer surface 632A and the inner wall surface 71*a* smaller than the dimension W1 of the first valve unit 60A in the −Y direction, the size of the recording head 10 can be reduced in the +Y direction.

In addition, it is preferable that the gap t1 between the portion facing the first outer surface 632A at a position different from the first opening portion 73 on the inner wall surface 71*a* forming the valve unit accommodation section 71 of the cover 70, and the first outer surface 632A be smaller than a maximum displacement amount D1 (see FIG. 13) of the first flexible film 63A in the −Y direction. Here, the maximum displacement amount D1 of the first flexible film 63A in the −Y direction is the dimension of a portion positioned most in the −Y direction when the first flexible film 63A is displaced in the −Y direction, and a portion positioned most in the +Y direction when the first flexible film 63A is displaced in the +Y direction. By making the gap t1 between the first outer surface 632A and the inner wall surface 71*a* smaller than the maximum displacement amount D1 of the first flexible film in this way, the size of the recording head 10 can be reduced in the +Y direction.

The cover 70 has a second opening portion 74 formed at a position facing at least a part of the second outer surface 632B of the second valve unit 60B. The second opening portion 74 penetrates the cover 70 along the Y axis to communicate the inside and the outside of the valve unit accommodation section 71. That is, a part of the second outer surface 632B of the second valve unit 60B is exposed to the outside by the second opening portion 74 provided in the cover 70. By exposing the second outer surface 632B of the second flexible film 63B to the outside of the cover 70 by the second opening portion 74 in this way, the second flexible film 63B can be pressed from the outside of the cover 70 in the +Y direction. Therefore, it is possible to forcibly open the second valve unit 60B from the outside of the cover 70.

In addition, as described above, at least a part of the second outer surface 632B of the second valve unit 60B does not overlap with the first valve unit 60A as viewed in the +Y direction. In addition, at least a part of the second outer surface 632B does not overlap with the third valve unit 60C as viewed in the +Y direction. Therefore, the second opening portion 74 is provided at a position on the second outer surface 632B that does not overlap with the first valve unit 60A and the third valve unit 60C as viewed in the +Y direction. That is, the second opening portion 74 is provided between the first valve unit 60A and the third valve unit 60C. Specifically, the second opening portion 74 is provided in the first partition wall 72A between the valve unit accommodation section 71 that accommodates the first valve unit 60A and the valve unit accommodation section 71 that accommodates the third valve unit 60C to penetrate in the direction along the Y axis. The second opening portion 74 is formed to have the same opening area in the direction along the Y axis. In addition, a dimension of the first partition wall 72A in the direction along the Y axis, that is, the distance L2 along the Y axis of the second opening portion 74 is larger than a maximum width W1 of the valve unit 60 along the Y axis. The maximum width W1 along the Y axis of the valve unit 60 is the maximum dimension in a state in which the flexible film 63 is most displaced toward a side opposite to the valve unit main body 61.

Here, a distance L1 from one end of the first opening portion 73 to the other end thereof is shorter than a distance L2 from one end of the second opening portion 74 to the other end thereof. That is, L1<L2. It should be noted that the distance L1 from one end of the first opening portion 73 to the other end thereof is the distance from the opening of the first opening portion 73 in the −Y direction along the Y axis to the opening thereof in the +Y direction. Similarly, the distance L2 from one end of the second opening portion 74 to the other end thereof is the distance from the opening of the second opening portion 74 in the −Y direction to the opening thereof in the +Y direction along the Y axis.

In addition, it is preferable that an area of the first opening portion 73 be larger than an area of the second opening portion 74. Here, the areas of the first opening portion 73 and the second opening portion 74 are the areas of the opening portions on the outer surface of the cover 70. The first outer surface 632A has a portion that is not covered with the second valve unit 60B as viewed in the −Y direction, and the valve unit 60 is not disposed in the −X direction with respect to the second valve unit 60B, so that the first opening portion 73 can be provided by expanding a width Wa in the −X direction. On the other hand, the second outer surface 632B overlaps both the first valve unit 60A and the third valve unit 60C as viewed in the +Y direction, and the second opening portion 74 is provided in the first partition wall 72A, so that a width Wb of the second opening portion 74 along the X axis is relatively small. Therefore, since the width Wa of the first opening portion 73 in the direction along the X axis can be made larger than the width Wb of the second opening portion 74, the area of the first opening portion 73 can be made larger than the area of the second opening portion 74 provided in the first partition wall 72A.

In addition, it is preferable that the gap t1 between a portion facing the first outer surface 632A at a position different from the first opening portion 73 on the inner wall surface 71*a* of the cover 70, and the first outer surface 632A be narrower than an interval t2 between of the first valve unit 60A and the second valve unit 60B in the −Y direction. That is, it is preferable that t1<t2. The interval t2 between the first valve unit 60A and the second valve unit 60B in the −Y direction is a distance in the −Y direction between a position at which the first flexible film 63A is most displaced toward a side opposite to the valve unit main body 61 of the first valve unit 60A, and a position at which the second flexible film 63B is most displaced toward a side opposite to the valve unit main body 61 of the second valve unit 60B. By making the gap t1 smaller than the interval t2 in this way, the size of the recording head 10 can be reduced in the direction along the Y axis.

In addition, similarly to the first opening portion 73 described above, it is preferable that the second opening portion 74 overlap with at least a part of the second valve body 62B as viewed in the +Y direction. In addition, it is preferable that the second opening portion 74 overlap with at least a part of the second pressure reception plate 66B as viewed in the +Y direction. As described above, by providing the second opening portion 74 at a position that overlaps with the second valve body 62B or a position that overlaps with the second pressure reception plate 66B as viewed in the +Y direction, the movement of the second valve body 62B can be stabilized when the second flexible film 63B is pressed from the outside of the cover 70 via the second opening portion 74. Therefore, the forcible valve opening of the second valve unit 60B can be stably performed.

The cover 70 has a third opening portion 75 formed at a position facing at least a part of the third outer surface 632C of the third valve unit 60C. The third opening portion 75 penetrates the cover 70 along the Y axis to communicate the inside and the outside of the valve unit accommodation section 71. That is, a part of the third outer surface 632C of the third valve unit 60C is exposed to the outside by the third opening portion 75 provided in the cover 70. By exposing the third outer surface 632C of the third flexible film 63C to the outside of the cover 70 by the third opening portion 75 in this way, the third flexible film 63C can be pressed from the outside of the cover 70 in the −Y direction. Therefore, it is possible to forcibly open the third valve unit 60C from the outside of the cover 70.

In addition, as described above, at least a part of the third outer surface 632C of the third valve unit 60C does not overlap with the second valve unit 60B as viewed in the −Y direction. In addition, at least a part of the third outer surface 632C does not overlap with the fourth valve unit 60D as viewed in the −Y direction. Therefore, the third opening portion 75 is provided at a position on the third outer surface 632C that does not overlap with the second valve unit 60B and the fourth valve unit 60D as viewed in the −Y direction.

That is, the third opening portion 75 is provided between the second valve unit 60B and the fourth valve unit 60D. Specifically, the third opening portion 75 is provided in the second partition wall 72B between the valve unit accommodation section 71 that accommodates the second valve unit 60B and the valve unit accommodation section 71 that accommodates the fourth valve unit 60D to penetrate in the direction along the Y axis. The third opening portion 75 is formed to have the same opening area in the direction along the Y axis. In addition, a dimension of the second partition wall 72B in the direction along the Y axis, that is, the distance L3 along the Y axis of the third opening portion 75 is larger than the maximum width W1 of the valve unit 60 along the Y axis.

Here, a distance L3 from one end of the third opening portion 75 to the other end thereof is provided with substantially the same dimension as the distance L2 from one end of the second opening portion 74 to the other end thereof. Therefore, the distance L1 of the first opening portion 73 is shorter than the distance L3 of the third opening portion 75. That is, L1<L3.

In addition, similarly to the first opening portion 73 described above, it is preferable that the third opening portion 75 overlap with at least a part of the third valve body 62C as viewed in the −Y direction. In addition, it is preferable that the third opening portion 75 overlap with at least a part of the third pressure reception plate 66C as viewed in the −Y direction. As described above, by providing the third opening portion 75 at a position that overlaps with the third valve body 62C or a position that overlaps with the third pressure reception plate 66C as viewed in the −Y direction, the movement of the third valve body 62C can be stabilized when the third flexible film 63C is pressed from the outside of the cover 70 via the third opening portion 75. Therefore, the forcible valve opening of the third valve unit 60C can be stably performed.

The cover 70 has a fourth opening portion 76 formed at a position facing at least a part of the fourth outer surface 632D of the fourth valve unit 60D. The fourth opening portion 76 penetrates the cover 70 along the X axis to communicate the inside and the outside of the valve unit accommodation section 71. That is, a part of the fourth outer surface 632D of the fourth valve unit 60D is exposed to the outside by the fourth opening portion 76 provided in the cover 70. By exposing the fourth outer surface 632D of the fourth flexible film 63D to the outside of the cover 70, that is, the outside of the valve unit accommodation section 71 by the fourth opening portion 76 in this way, the fourth flexible film 63D can be pressed from the outside of the cover 70 in the +Y direction, which is the second direction. Therefore, it is possible to forcibly open the fourth valve unit 60D from the outside of the cover 70.

In addition, it is preferable that an area of the fourth opening portion 76 be larger than an area of the third opening portion 75. Here, the areas of the fourth opening portion 76 and the third opening portion 75 are the areas of the opening portions on the outer surface of the cover 70. The fourth outer surface 632D has a portion that is not covered with the third valve unit 60C as viewed in the +Y direction, and the valve unit 60 is not disposed in the +X direction with respect to the third valve unit 60C, so that the fourth opening portion 76 can be provided by expanding a width Wd in the +X direction. Therefore, the area of the fourth opening portion 76 is the same as the area of the first opening portion 73. On the other hand, the third outer surface 632C overlaps both the second valve unit 60B and the fourth valve unit 60D as viewed in the −Y direction, and the third opening portion 75 is provided in the second partition wall 72B, so that a width Wc of the third opening portion 75 along the X axis is relatively small. In the present embodiment, the opening area of the third opening portion 75 is the same as the area of the second opening portion 74. Therefore, the width Wd of the fourth opening portion 76 in the direction along the X axis can be made larger than the width Wc of the third opening portion 75, so that the area of the fourth opening portion 76 can be made larger than the area of the third opening portion 75 provided in the second partition wall 72B.

In addition, it is preferable that the relationship of t1, W1, t2, and D1 between the first valve unit 60A and the second valve unit 60B described above be the same relationship even when the first valve unit 60A and the second valve unit 60B are replaced with the fourth valve unit 60D and the third valve unit 60C. That is, it is preferable that t1, W1, t2, and D1 between the fourth valve unit 60D and the third valve unit 60C satisfy the relationship described above even when the first valve unit 60A is replaced with the fourth valve unit 60D and the second valve unit 60B is replaced with the third valve unit 60C.

In addition, similarly to the first opening portion 73 described above, it is preferable that the fourth opening portion 76 overlap with at least a part of the fourth valve body 62D as viewed in the +Y direction. In addition, it is preferable that the fourth opening portion 76 overlap with at least a part of the fourth pressure reception plate 66D as viewed in the +Y direction. As described above, by providing the fourth opening portion 76 at a position that overlaps with the fourth valve body 62D or a position that overlaps with the fourth pressure reception plate 66D as viewed in the +Y direction, the movement of the fourth valve body 62D can be stabilized when the fourth flexible film 63D is pressed from the outside of the cover 70 via the fourth opening portion 76. Therefore, the forcible valve opening of the fourth valve unit 60D can be stably performed.

A relay substrate 51 is fixed to each of the surfaces of the flow path member 50 in the +X direction and −X direction. The relay substrate 51 is formed by a rigid substrate, and is provided independently for each liquid ejecting section 20. That is, in the present embodiment, two relay substrates 51 are fixed side by side along the X axis on the surface of the flow path member 50 in the +Y direction. In addition, the two relay substrates 51 are fixed side by side along the X axis on the surface of the flow path member 50 in the −Y direction. Of course, the two relay substrates 51 provided on each of the surfaces in the +Y direction and the −Y direction may be used as one common relay substrate 51 that is continuous along the X axis.

The wiring substrate 22 of each liquid ejecting section 20 is electrically coupled to each of such relay substrates 51. That is, an end portion of the wiring substrate 22 on a side opposite to the liquid ejecting section 20 is derived to the outside from a side surface in the direction along the Y axis, and is electrically coupled to an end portion in the +Z direction of the relay substrate 51 fixed to the side surface of the flow path member 50 of the Y axis.

In addition, a convex portion 77 protruding in the −Z direction is provided on the surface of the cover 70 in the −Z direction. The convex portion 77 is continuously provided along the X axis. A coupling substrate 78 is fixed to each of the surfaces of the convex portion 77 in the +Y direction and −Y direction. The coupling substrate 78 is formed by a rigid substrate, and two coupling substrates 78 are provided, one in each of the +Y direction and the −Y direction of the convex portion 77. Each of the coupling substrates 78 is provided with two connectors 78*a* to which each of two wiring members 52 is coupled and a connector 78*b* to which a wiring from the outside (not shown) is coupled, and various signals, such as a printing signal, are supplied from the outside via the connector 78*b*. Such a coupling substrate 78 and a relay substrate 51 are electrically coupled via the wiring member 52. As the wiring member 52, a flexible sheet-like member, for example, a so-called flexible wiring, such as a COF substrate, FFC, or FPC, is used. The wiring member 52 is provided independently for each relay substrate 51. That is, the wiring members 52 are arranged side by side along the X axis on the surface of the cover 70 in the +Y direction. In addition, the wiring members 52 are arranged side by side along the X axis on the surface of the cover 70 in the −Y direction. Here, among the wiring members 52, the wiring member 52 disposed at a position that overlaps with the first valve unit 60A as viewed in the +Y direction is referred to as a first wiring member 52A. In addition, the wiring member 52 disposed at a position that overlaps with the second valve unit 60B as viewed in the −Y direction is referred to as a second wiring member 52B. Similarly, the wiring member 52 disposed at a position that overlaps with the third valve unit 60C as viewed in the +Y direction is referred to as a third wiring member 52C, and the wiring member 52 disposed at a position that overlaps with the fourth valve unit 60D as viewed in −Y direction is referred to as a fourth wiring member 52D. Moreover, the first wiring member 52A is provided on the side opposite to the first outer surface 632A of the first valve unit 60A in the cover 70 in the −Y direction. In addition, the second wiring member 52B is provided on the side opposite to the second outer surface 632B of the second valve unit 60B in the cover 70 in the +Y direction. Similarly, the third wiring member 52C is provided on the side opposite to the third outer surface 632C of the third valve unit 60C in the cover 70 in the −Y direction, and the fourth wiring member 52D is provided on the side opposite to the fourth outer surface 632D of the fourth valve unit 60D in the cover 70 in the +Y direction. It should be noted that, in the present embodiment, the first wiring member 52A and the first outer surface 632A are disposed at overlapping positions as viewed in the +Y direction. In addition, the second wiring member 52B and the second outer surface 632B are disposed at overlapping positions as viewed in the −Y direction. In addition, the third wiring member 52C and the third outer surface 632C are disposed at overlapping positions as viewed in the +Y direction. Further, the fourth wiring member 52D and the fourth outer surface 632D are disposed at overlapping positions as viewed in the −Y direction. It should be noted that each wiring member 52 is disposed at a position that does not block the openings of the first opening portion 73, the second opening portion 74, the third opening portion 75, and the fourth opening portion 76.

In this way, the wiring member 52 is provided on the outside of the cover 70, that is, on the side surfaces in the +Y direction and the −Y direction, so that each valve unit 60 is disposed such that the outer surface 632 of the flexible film 63 faces the opposite side of the wiring member 52 in the Y axis. That is, since the first wiring member 52A is positioned in the −Y direction with respect to the first valve unit 60A, the first valve unit 60A is disposed such that the first outer surface 632A of the first flexible film 63A faces the +Y direction opposite to the first wiring member 52A. In other words, the first wiring member 52A is provided on a side opposite to the first outer surface 632A with respect to the surface of the first valve unit 60A opposite to the first outer surface 632A. The same applies to the second valve unit 60B, the third valve unit 60C, and the fourth valve unit 60D. In this way, by disposing the valve unit 60 such that the outer surface 632 of the flexible film 63 is on the side opposite to the wiring member 52, it is possible to prevent the wiring member 52 from inhibiting the deformation of the flexible film 63. In addition, by providing the wiring member 52 on the outside of the cover 70, even when the outer surface 632 of the flexible film 63 of each valve unit 60 faces the center side of the recording head 10 in the +Y direction, the flexible film 63 can be pressed from the outside of the cover 70 via the first opening portion 73, the second opening portion 74, the third opening portion 75, and the fourth opening portion 76 to forcibly open the valve unit 60.

In addition, a flow path opening portion 79 for exposing the supply path 641 of each valve unit 60 is provided on the surface of the cover 70 in the −Z direction. An end portion of the valve unit 60 in which the supply path 641 is opened is provided in a protrusion portion protruding in the −Z direction, and the protrusion portion in which the supply path 641 is opened is inserted into the flow path opening portion 79 of the cover 70. As a result, the supply member 2 can be coupled to the supply path 641 on the −Z direction side of the recording head 10.

Figure 14:
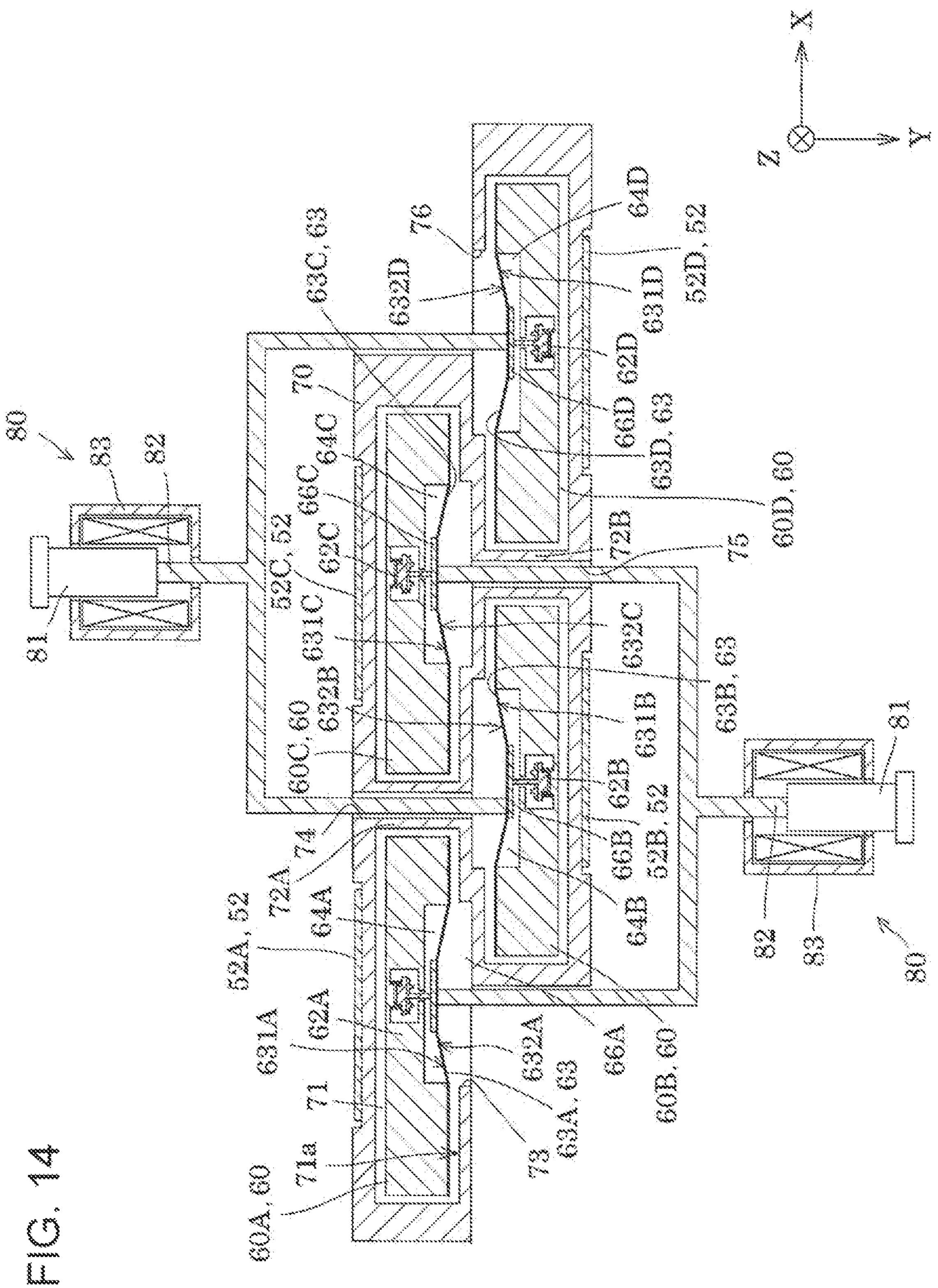
FIG. 14 is a cross-sectional view of the recording head and a pressing mechanism.

Here, an example of the pressing mechanism that forcibly opens the valve unit 60 will be described with reference to FIG. 14. It should be noted that FIG. 14 is a cross-sectional view of the recording head 10 and the pressing mechanism 80 taken along the line XIV-XIV. In addition, FIG. 14 shows a state in which the forcible valve opening is performed by the pressing mechanism 80.

As shown in FIG. 14, the pressing mechanism 80 is separately provided on the outside of the cover 70 of the recording head 10. In the present embodiment, two pressing mechanisms 80 are provided, one in each of the +Y direction and the −Y direction of the recording head 10. In the following, the pressing mechanism 80 disposed in the +Y direction of the recording head 10 will be described.

The pressing mechanism 80 is constituted by, for example, a push solenoid, and moves a shaft 82 coupled to a plunger 81 by on/off control from the control unit 8 along the Y axis with respect to a frame member 83. The frame member 83 is fixed to, for example, the support 3 or the apparatus main body 7. The shaft 82 is bifurcated on a distal end side, and two distal ends of the shaft are disposed at positions facing the first outer surface 632A exposed to the first opening portion 73 and the third outer surface 632C exposed to the third opening portion 75, respectively, on the −Y axis. In the pressing mechanism 80, by moving the shaft 82 in the −Y direction with respect to the frame member 83, the distal ends of the shaft 82 abut on the first outer surface 632A and the third outer surface 632C exposed to the first opening portion 73 and the third opening portion 75, respectively, and the first flexible film 63A and the third flexible film 63C are pressed by the shaft 82 in the −Y direction and displaced. As a result, it is possible to forcibly open the first valve unit 60A and the third valve unit 60C at the same time.

It should be noted that, since the pressing mechanism 80 disposed in the −Y direction is the same as the pressing mechanism 80 disposed in the +Y direction, the overlapping description will be omitted. It is possible to forcibly open the second valve unit 60B and the fourth valve unit 60D at the same time by the pressing mechanism 80 disposed in the −Y direction.

In the present embodiment, since two valve units 60 can be forcibly opened by one pressing mechanism 80, the configuration can be simplified, the cost can be reduced, and the size can be reduced, as compared with the configuration in which the pressing mechanism is provided for each of the valve units 60. Of course, the pressing mechanism may be provided for each of the valve units 60.

In addition, three recording heads 10 are arranged side by side along the X axis in one head unit 1. Therefore, when the distal end of the shaft 82 is branched in accordance with the number of the valve units 60 to be forcibly opened, the valve units 60 provided in two or more of the plurality of the recording heads 10 can be forcibly opened at the same time by one pressing mechanism 80. That is, in the present embodiment, it is possible to forcibly open at maximum six valve units 60 by one pressing mechanism 80.

In addition, in the present embodiment, the second opening portion 74 and the third opening portion 75 are provided in the first partition wall 72A and the second partition wall 72B, and have a shape in which the opening areas in the direction along the Y axis are substantially the same. Therefore, the distal end of the shaft 82 can be moved toward the second flexible film 63B and the third flexible film 63C by being guided by the inner wall surfaces of the second opening portion 74 and the third opening portion 75, so that the forcible valve opening by the distal end of the shaft 82 can be reliably performed.

It should be noted that, in the head unit 1 according to the present embodiment, two rows each having three recording heads 10 arranged side by side along the X axis are provided on the Y axis. Therefore, a gap between two recording heads 10 adjacent to each other in the direction along the Y axis is relatively small. Therefore, when pressing the flexible film 63 exposed toward the gap between the recording heads 10 adjacent to each other in the direction along the Y axis, the shaft 82 of the pressing mechanism 80 need only be derived in the +X direction or the −X direction of the gap.

In addition, in the present embodiment, the push solenoid is used as the pressing mechanism 80, but the present disclosure is not particularly limited to this, and an eccentric cam and a drive motor that rotates the eccentric cam may be used, and a hydraulic pump or the like may be used.

In addition, in the present embodiment, one pressing mechanism 80 forcibly opens two valve units 60 of one recording head 10 at the same time, but the present disclosure is not particularly limited to this, and one pressing mechanism 80 may forcibly open four valve units 60 of one recording head 10. For example, the shafts 82 may be provided at both end portions of the plunger 81, one shaft 82 may forcibly open two valve units 60 by moving the plunger 81 in the −Y direction the other shaft 82 may forcibly open two valve units 60 by moving the plunger 81 in the +Y direction. In addition, one pressing mechanism may forcibly open the four valve units 60 at the same time by combining gears and the like.

In addition, in the present embodiment, the pressing mechanism 80 is provided, but the present disclosure is not particularly limited to this, and an operator may forcibly open the valve by using a finger, a pin, or the like. Since the first opening portion 73 or the fourth opening portion 76 has a larger area than the second opening portion 74 or the third opening portion 75, the first opening portion 73 or the fourth opening portion 76 can easily pass a finger, and it is easy to directly press the first flexible film 63A and the fourth flexible film 63D with a finger.

As described above, the recording head 10, which is the liquid ejecting head according to the present embodiment, includes the liquid ejecting section 20 that ejects the ink, which is the liquid, the first valve unit 60A that adjusts the pressure of the ink to be supplied to the liquid ejecting section 20, and the cover 70 constituting the housing that accommodates the liquid ejecting section 20 and the first valve unit 60A. In addition, the first valve unit 60A has the first flow path 64A that communicates with the liquid ejecting section 20, and the first flexible film 63A that has the first inner surface 631A defining a part of the first flow path 64A and the first outer surface 632A being opposite to the first inner surface 631A and being in contact with the atmosphere, and is displaceable in the −Y direction, which is the first direction, from the first outer surface 632A toward the first inner surface 631A and in the +Y direction, which is the second direction, opposite to the −Y direction. In addition, the first valve unit 60A includes the first valve body 62A that is moved between the opening position at which the first flow path 64A is opened and the closing position at which the first flow path 64A is closed, due to the displacement of the first flexible film 63A. The cover 70 has the first opening portion 73 formed at the position facing at least a part of the first outer surface 632A.

In this way, since the first outer surface 632A is exposed to the outside by the first opening portion 73 formed in the cover 70, the first flexible film 63A can be operated from the outside of the recording head 10. Therefore, it is not necessary to provide the pressing mechanism or the like that operates the first flexible film 63A inside the recording head 10, and the size of the recording head 10 can be reduced and the structure thereof can be simplified. In addition, since the first flexible film 63A can be easily operated from the outside of the recording head 10 via the first opening portion 73, it is possible to cause the forcible displacement due to the external force regardless of the differential pressure between the first inner surface 631A and the first outer surface 632A of the first flexible film 63A, and it is possible to move the first valve body 62A to the opening position to perform the forcible valve opening.

In addition, in the recording head 10 according to the present embodiment, it is preferable that the first opening portion 73 overlap with at least a part of the first valve body 62A as viewed in the −Y direction, which is the first direction. According to this, when the first flexible film 63A is pressed in the −Y direction for the forcible valve opening, the movement of the valve body 62 in the −Y direction can be stabilized. Therefore, it is possible to perform the stable forcible valve opening.

In addition, in the recording head 10 according to the present embodiment, it is preferable that the first valve unit 60A include the first pressure reception plate 66A, which is the pressure reception plate 66, that has a higher Young's modulus than the first flexible film 63A, is provided on the first inner surface 631A of the first flexible film 63A, and comes into contact with the distal end of the first valve body 62A when the first valve body 62A is positioned at the opening position, and the first opening portion 73 overlap with at least a part of the first pressure reception plate 66A as viewed in the −Y direction, which is the first direction. According to this, when the first flexible film 63A is pressed in the −Y direction for the forcible valve opening, the first pressure reception plate 66A can be pressed, and the movement of the first valve body 62A that is moved by the first pressure reception plate 66A can be stabilized. Therefore, it is possible to perform the stable forcible valve opening.

In addition, in the recording head 10 according to the present embodiment, it is preferable that the gap t1 between the portion facing the first outer surface 632A at a position different from the first opening portion 73 on the inner wall surface 71*a* of the cover 70 constituting the housing, and the first outer surface 632A be smaller than the dimension W1 of the first valve unit 60A in the −Y direction, which is the first direction. According to this, the size of the recording head 10 can be reduced in the −Y direction. It should be noted that, it is further preferable that the gap t1 be smaller than ½ of the dimension W1 of the first valve unit 60A.

In addition, in the recording head 10 according to the present embodiment, it is preferable that the gap t1 between the portion facing the first outer surface 632A at a position different from the first opening portion 73 on the inner wall surface 71*a* of the cover 70 constituting the housing, and the first outer surface 632A be smaller than the maximum displacement amount D1 of the first flexible film 63A in the −Y direction, which is the first direction. According to this, the size of the recording head 10 can be reduced in the −Y direction.

In addition, the recording head 10 according to the present embodiment further includes the second valve unit 60B that is disposed in the cover 70 constituting the housing, and adjusts the pressure of the ink, which is the liquid, to be supplied to the liquid ejecting section 20. In addition, the second valve unit 60B has the second flow path 64B that communicates with the liquid ejecting section 20, and the second flexible film 63B that has the second inner surface 631B defining a part of the second flow path 64B and the second outer surface 632B being opposite to the second inner surface 631B and being in contact with the atmosphere, and is displaceable in the +Y direction, which is the second direction, from the second outer surface 632B toward the second inner surface 631B and in the −Y direction, which is the first direction. In addition, the second valve unit 60B includes the second valve body 62B that is moved between the opening position at which the second flow path 64B is opened and the closing position at which the second flow path 64B is closed, due to the displacement of the second flexible film 63B. The second valve unit 60B is positioned to deviate from the first valve unit 60A in the +Y direction, and the +Z direction or the +Y direction, which is the third direction orthogonal to the −Y direction, to overlap with a part of the first valve unit 60A as viewed in the −Y direction. In addition, at least a part of the first outer surface 632A does not overlap with the second valve unit 60B as viewed in the −Y direction. In addition, at least a part of the second outer surface 632B does not overlap with the first valve unit 60A as viewed in the +Y direction. In addition, it is preferable that the cover 70 constituting the housing have the second opening portion 74 formed at a position facing at least a part of the second outer surface 632B.

As described above, even when the recording head 10 is provided with the plurality of valve units 60 and the outer surfaces 632 of the plurality of valve units 60 are disposed to face each other, since at least a part of the outer surface 632 of the valve unit 60 is disposed not to overlap with other valve units 60, it is possible to perform the forcible valve opening via the first opening portion 73 and the second opening portion 74. It should be noted that the outer surfaces 632 of the plurality of valve units 60 may be disposed facing the outside and not to face each other.

In addition, in the recording head 10 according to the present embodiment, it is preferable that the third direction be the +X direction orthogonal to the +Z direction, which is the ejection direction, in which the liquid ejecting section 20 ejects the ink, which is the liquid. According to this, it is possible to suppress the increase in the size of the recording head 10 in the +Z direction and to reduce the size thereof in the +Z direction.

In addition, in the recording head 10 according to the present embodiment, it is preferable that the first valve unit 60A and the second valve unit 60B be disposed at the same position in the +Z direction, which is the ejection direction. According to this, the size of the recording head 10 can be reduced in the +Z direction.

In addition, in the recording head 10 according to the present embodiment, it is preferable that the distance L1 from the opening at one end of the first opening portion 73 to the opening at the other end thereof be shorter than the distance L2 from the opening at one end of the second opening portion 74 to the opening at the other end thereof. By forming the cover 70 in a shape along the disposition of the plurality of valve units 60, the distance L1 of the first opening portion 73 can be made shorter than the distance L2 of the second opening portion 74. Therefore, the size of the cover 70 can be reduced.

In addition, in the recording head 10 according to the present embodiment, it is preferable that the area of the first opening portion 73 be larger than the area of the second opening portion 74. By making the area of the first opening portion 73 larger than the area of the second opening portion 74, it is easy to press the first flexible film 63A via the first opening portion 73.

In addition, in the recording head 10 according to the present embodiment, it is preferable that the gap t1 between the portion facing the first outer surface 632A at a position different from the first opening portion 73 on the inner wall surface 71*a* of the cover 70 constituting the housing, and the first outer surface 632A be narrower than the interval t2 between of the first valve unit 60A and the second valve unit 60B in the −Y direction, which is the first direction. According to this, the size of the recording head 10 can be reduced in the −Y direction.

In addition, in the recording head 10 according to the present embodiment, it is preferable that the first outer surface 632A and the second valve unit 60B partially overlap with each other as viewed in the −Y direction, which is the first direction. According to this, the size of the recording head 10 can be reduced in the +X direction.

In addition, it is preferable that the recording head 10 according to the present embodiment include the first wiring member 52A that is provided on a side opposite to the first outer surface 632A with respect to a surface of the first valve unit 60A opposite to the first outer surface 632A, and is coupled to the liquid ejecting section 20, and the second wiring member 52B that is provided on a side opposite to the second outer surface 632B with respect to a surface of the second valve unit 60B opposite to the second outer surface 632B, and is coupled to the liquid ejecting section 20. In the disposition in which the wiring member 52 is drawn around the outside of the region in which the valve unit 60 is provided, it is necessary to make the flexible film 63 of the valve unit 60 face to the inside of the recording head 10. Even in the configuration in which the flexible film 63 faces the inside of the recording head 10 in this way, the valve unit 60 can be forcibly opened by operating the flexible film 63 from the outside by the first opening portion 73 and the second opening portion 74.

In addition, the recording head 10 according to the present embodiment further includes the third valve unit 60C that is disposed in the cover 70 constituting the housing, and adjusts the pressure of the ink, which is the liquid, to be supplied to the liquid ejecting section 20. It is preferable that the third valve unit 60C be disposed in the +Z direction or the +X direction, which is the third direction, with respect to the first valve unit 60A and be disposed to overlap with a part of the second valve unit 60B as viewed in the +Y direction, which is the second direction, and the second opening portion 74 be provided between the first valve unit 60A and the third valve unit 60C. Even when the first valve unit 60A, the second valve unit 60B, and the third valve unit 60C are disposed as described above, the second opening portion 74 can be provided between the first valve unit 60A and the third valve unit 60C. Moreover, the second valve unit 60B can be forcibly opened by operating the second flexible film 63B from the outside of the housing via the second opening portion 74.

In addition, in the recording head 10 according to the present embodiment, it is preferable that the cover 70 constituting the housing have the first partition wall 72A, which is the partition wall, that partitions the first valve unit 60A and the third valve unit 60C, and the second opening portion 74 be formed to penetrate the first partition wall 72A in the −Y direction, which is the first direction. The shaft 82 that operates the second flexible film 63B can be guided by the inner wall surface of the second opening portion 74, and the second valve unit 60B can be reliably forcibly opened.

In addition, in the recording head 10 according to the present embodiment, it is preferable that the second flexible film 63B overlap with both the first valve unit 60A and the third valve unit 60C as viewed in the +Y direction, which is the second direction. According to this, the size of the recording head 10 can be reduced in the +X direction.

In addition, the ink jet type recording apparatus I, which is an example of the liquid ejecting apparatus according to the present embodiment, includes the recording head 10 which is an example of the liquid ejecting head described above, and the liquid storage section 4 that stores the ink, which is the liquid, to be supplied to the recording head 10. As described above, it is not necessary to provide the pressing mechanism or the like that operates the first flexible film 63A inside the recording head 10, and the size of the recording head 10 can be reduced and the structure thereof can be simplified. Therefore, the size of the ink jet type recording apparatus I including the recording head 10 can be reduced and the structure thereof can be simplified.

Other Embodiments

One embodiment of the present disclosure has been described above, but the basic configuration of the present disclosure is not limited to the above.

For example, in the first embodiment described above, the configuration has been described in which the relay substrate 51 and the wiring member 52 are exposed to the side surfaces of the flow path member 50 and the cover 70, but the present disclosure is not limited to this, and wiring covers that cover the relay substrate 51 and the wiring member 52, respectively, may be provided on both sides of the cover 70 in the +Y direction and the −Y direction. When the wiring cover is provided, the communication holes that communicate with the first opening portion 73, the second opening portion 74, the third opening portion 75, and the fourth opening portion 76 are provided on the wiring cover, so that the flexible film 63 of each valve unit 60 can be exposed to the outside, and the flexible film 63 can be operated from the outside of the wiring cover and forcibly opened.

In addition, the valve unit 60 may be provided with a flow path or the like for collecting the ink that has not been ejected from the nozzle 21 out of the ink supplied to the liquid ejecting section 20. That is, the ink may be circulated between the liquid storage section 4 and the liquid ejecting section 20.

In addition, the valve unit 60 may be provided with a filter that removes foreign substances, such as dust or air bubbles, contained in the ink flowing through the valve unit flow path 64.

In addition, in the first embodiment described above, the third direction is the +X direction, but the present disclosure is not particularly limited to this. Since the third direction need only be the direction orthogonal to the −Y direction, which is the first direction, for example, the third direction may be the +Z direction. That is, the second valve unit 60B may be disposed at a position deviating from the first valve unit 60A in the +Y direction and the +Z direction to partially overlap with the first valve unit 60A as viewed in the −Y direction. Even in this case, since the first flexible film 63A can be pressed in the −Y direction, which is the first direction, via the first opening portion 73, the first valve unit 60A can be forcibly opened. It should be noted that the same applies to the third valve unit 60C and the fourth valve unit 60D.

Further, the present disclosure is intended for a wide range of the liquid ejecting head in general, and can be applied to, for example, a recording head, such as various ink jet type recording heads used in image recording apparatuses, such as printers, a color material ejecting head used in the manufacture of a color filter of a liquid crystal display or the like, an electrode material ejecting head used for electrode formation of an organic EL display, a field emission display (FED), or the like, and a bioorganic matter ejecting head used for biochip manufacture. In addition, although the ink jet type recording apparatus has been described as an example of the liquid ejecting apparatus, the present disclosure can also be used for a liquid ejecting apparatus using the other liquid ejecting head described above.

What is claimed is:

1. A liquid ejecting head comprising:

a liquid ejecting section configured to eject liquid;

a first valve unit that adjusts a pressure of the liquid to be supplied to the liquid ejecting section; and a housing that accommodates the liquid ejecting section and the first valve unit, wherein the first valve unit includes a first flow path that communicates with the liquid ejecting section, a first flexible film that has a first inner surface defining a part of the first flow path and a first outer surface being opposite from the first inner surface and being in contact with an atmosphere, and is configured to displace in a first direction from the first outer surface toward the first inner surface and in a second direction opposite to the first direction, and a first valve body that is moved between an opening position at which the first flow path is opened and a closing position at which the first flow path is closed, due to displacement of the first flexible film, the housing defines an outer surface of the liquid ejecting head, the housing and the first valve unit are separated from each other, and the housing has a first opening portion facing at least a part of the first outer surface and not defining a flow path.

2. The liquid ejecting head according to claim 1, wherein the first opening portion overlaps with at least a part of the first valve body as viewed in the first direction.

3. The liquid ejecting head according to claim 1, wherein the first valve unit includes a pressure reception plate that has a higher Young's modulus than the first flexible film, is disposed on the first inner surface of the first flexible film, and comes into contact with a distal end of the first valve body when the first valve body is positioned at the opening position, and the first opening portion overlaps with at least a part of the pressure reception plate as viewed in the first direction.

4. The liquid ejecting head according to claim 1, wherein a gap between a portion of an inner wall surface of the housing facing the first outer surface and being at a position different from the first opening portion, and the first outer surface is smaller than a dimension of the first valve unit in the first direction.

5. The liquid ejecting head according to claim 1, wherein a gap between a portion of an inner wall surface of the housing facing the first outer surface and being at a position different from the first opening portion, and the first outer surface is smaller than a maximum displacement amount of the first flexible film in the first direction.

6. A liquid ejecting apparatus comprising:

the liquid ejecting head according to claim 1; and a liquid storage section that stores the liquid to be supplied to the liquid ejecting head.

7. A liquid ejecting head comprising:

a liquid ejecting section configured to eject liquid;

a first valve unit that adjusts a pressure of the liquid to be supplied to the liquid ejecting section; and a housing that accommodates the liquid ejecting section and the first valve unit, wherein the first valve unit includes a first flow path that communicates with the liquid ejecting section, a first flexible film that has a first inner surface defining a part of the first flow path and a first outer surface being opposite from the first inner surface and being in contact with an atmosphere, and is configured to displace in a first direction from the first outer surface toward the first inner surface and in a second direction opposite to the first direction, and a first valve body that is moved between an opening position at which the first flow path is opened and a closing position at which the first flow path is closed, due to displacement of the first flexible film, and the housing has a first opening portion facing at least a part of the first outer surface; and a second valve unit that is disposed in the housing and that adjusts the pressure of the liquid to be supplied to the liquid ejecting section, wherein the second valve unit includes a second flow path that communicates with the liquid ejecting section, a second flexible film that has a second inner surface defining a part of the second flow path and a second outer surface being opposite from the second inner surface and being in contact with an atmosphere, and is configured to displace in the second direction from the second outer surface toward the second inner surface and the first direction, and a second valve body that is moved between an opening position at which the second flow path is opened and a closing position at which the second flow path is closed, due to displacement of the second flexible film, the second valve unit is positioned to deviate from the first valve unit in the second direction and a third direction orthogonal to the first direction to overlap with a part of the first valve unit as viewed in the first direction, the at least a part of the first outer surface does not overlap with the second valve unit as viewed in the first direction, at least a part of the second outer surface does not overlap with the first valve unit as viewed in the second direction, and the housing has a second opening portion facing the at least a part of the second outer surface.

8. The liquid ejecting head according to claim 7, wherein the third direction is a direction orthogonal to an ejection direction in which the liquid ejecting section ejects the liquid.

9. The liquid ejecting head according to claim 8, wherein the first valve unit and the second valve unit are disposed at the same position regarding the ejection direction.

10. The liquid ejecting head according to claim 7, wherein a distance from an opening at one end of the first opening portion to an opening at the other end thereof is shorter than a distance from an opening at one end of the second opening portion to an opening at the other end thereof.

11. The liquid ejecting head according to claim 7, wherein an area of the first opening portion is larger than an area of the second opening portion.

12. The liquid ejecting head according to claim 7, wherein a gap between a portion of an inner wall surface of the housing facing the first outer surface and being at a position different from the first opening portion, and the first outer surface is narrower than an interval between the first valve unit and the second valve unit in the first direction.

13. The liquid ejecting head according to claim 7, wherein the first outer surface and the second valve unit partially overlap with each other as viewed in the first direction.

14. The liquid ejecting head according to claim 7, further comprising:

a first wiring member being coupled to the liquid ejecting section; and a second wiring member being coupled to the liquid ejecting section, wherein a surface of the first valve unit that is opposite from the first outer surface is between the first outer surface and the first wiring member, and a surface of the second valve unit that is opposite from the second outer surface is located between the second outer surface and the second wiring member.

15. The liquid ejecting head according to claim 7, further comprising:

a third valve unit that is disposed in the housing, and adjusts the pressure of the liquid to be supplied to the liquid ejecting section, wherein the third valve unit is disposed in the third direction with respect to the first valve unit and is disposed to overlap with a part of the second valve unit as viewed in the second direction, and the second opening portion is located between the first valve unit and the third valve unit.

16. The liquid ejecting head according to claim 15, wherein the housing has a partition wall that partitions the first valve unit and the third valve unit, and the second opening portion penetrates the partition wall in the first direction.

17. The liquid ejecting head according to claim 15, wherein the second flexible film overlaps with both the first valve unit and the third valve unit as viewed in the second direction.

18. A liquid ejecting apparatus comprising:

the liquid ejecting head according to claim 7; and a liquid storage section that stores the liquid to be supplied to the liquid ejecting head.

* * * * *